(12) United States Patent
Wang et al.

(10) Patent No.: US 12,166,623 B2
(45) Date of Patent: Dec. 10, 2024

(54) FILTERING METHOD FOR CARRIER PHASE MEASUREMENTS FROM OPEN-LOOP TRACKING

(71) Applicant: The Regents of the University of Colorado, a body corporate, Denver, CO (US)

(72) Inventors: Yang Wang, Boulder, CO (US); Yu T. Morton, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 55 days.

(21) Appl. No.: 18/249,580

(22) PCT Filed: Oct. 18, 2021

(86) PCT No.: PCT/US2021/055375
§ 371 (c)(1),
(2) Date: Apr. 19, 2023

(87) PCT Pub. No.: WO2022/125192
PCT Pub. Date: Jun. 16, 2022

(65) Prior Publication Data
US 2023/0388175 A1    Nov. 30, 2023

Related U.S. Application Data

(60) Provisional application No. 63/094,770, filed on Oct. 21, 2020.

(51) Int. Cl.
*H04L 27/38* (2006.01)
*H04L 27/00* (2006.01)

(52) U.S. Cl.
CPC ...... *H04L 27/3863* (2013.01); *H04L 27/0014* (2013.01); *H04L 2027/0067* (2013.01)

(58) Field of Classification Search
CPC ............ H04L 27/3863; H04L 27/0014; H04L 2027/0067
See application file for complete search history.

(56) References Cited

U.S. PATENT DOCUMENTS 9,709,683 B2 *   7/2017   Leandro ................ G01S 19/072
9,891,325 B2 *   2/2018   Milyutin ................ G01S 19/43
(Continued)

OTHER PUBLICATIONS

International Search Report and Written Opinion for PCT/US21/55375 mailed Jul. 6, 2022.

*Primary Examiner* — Jaison Joseph
(74) *Attorney, Agent, or Firm* — Kasha Law LLC; John R. Kasha; Kelly L. Kasha

(57) ABSTRACT

DLOS and reflected signal components of an RF carrier signal are received. The reflected component is reflected from a point on the surface of the earth. The DLOS and reflected components are converted to digital DLOS IF and reflected IF signals, respectively. Modeled parameters are generated using the digital DLOS IF signal and locations of one or more antennas, the transmitter, and the point. A reference signal is generated based on the modeled parameters. The reference signal is correlated with the digital reflected IF signal to produce in-phase and quadrature-phase correlation results. A C/N0 and an estimated phase (EP) are calculated for the digital reflected IF signal from the correlation results. A KF is applied to the EP to produce an estimated filter phase (EFP). The KF is adapted to filter the EP using the estimated C/N0 to reduce cycle slips and noise in the EFP.

19 Claims, 18 Drawing Sheets

(56) References Cited

U.S. PATENT DOCUMENTS

| | | | |
|---|---|---|---|
| 2002/0130813 A1* | 9/2002 | Neira | G01S 19/39 342/462 |
| 2007/0085738 A1* | 4/2007 | Whitehead | G01S 19/53 342/357.36 |
| 2013/0234885 A1* | 9/2013 | Geier | G01S 19/49 342/357.23 |
| 2014/0062781 A1* | 3/2014 | Mathews | G01S 19/11 342/357.64 |
| 2016/0033649 A1* | 2/2016 | Mathews | G01S 19/246 342/357.48 |
| 2017/0248678 A1* | 8/2017 | Markhovsky | G01S 13/74 |
| 2018/0017672 A1* | 1/2018 | Warke | G01S 15/08 |
| 2018/0074206 A1* | 3/2018 | Niesen | G01S 19/22 |
| 2021/0223387 A1* | 7/2021 | Wang | G01S 13/003 |
| 2023/0333245 A1* | 10/2023 | Wang | G01S 19/22 |
| 2023/0388175 A1* | 11/2023 | Wang | H04L 27/0014 |

* cited by examiner

FILTERING METHOD FOR CARRIER PHASE MEASUREMENTS FROM OPEN-LOOP TRACKING

RELATED APPLICATIONS

This application claims the benefit of U.S. Provisional Patent Application Ser. No. 63/094,770, filed on Oct. 21, 2020, the content of which is incorporated by reference herein in its entirety.

GOVERNMENT INTEREST

This invention was made with government support under grant number HR001118S0055 awarded by DOD/DARPA. The government has certain rights in the invention.

TECHNICAL FIELD

The teachings herein relate to applying simultaneous cycle slip and noise filtering (SCANF) to reduce cycle slips and noise in phase measurements of a reflected radio frequency (RF) carrier signal used in open-loop (OL) tracking. More particularly, the teachings herein relate to systems and methods that apply a filter that uses estimated carrier-to-noise ratio ($C/N_0$) measurements to locate and remove the cycle slips and noise in the corresponding estimated phase measurements. The systems and methods disclosed herein can be performed in conjunction with a processor, controller, microcontroller, or computer system, such as the computer system of FIG. 1.

BACKGROUND

Remote sensing is used to measure topographical features on the earth's surface. Remote sensing satellite and airborne devices have traditionally been used to measure topographical features with heights on the order of kilometers (km) and even meters (m) because they can provide global coverage. However, for topographical features with heights on the order of centimeters (cm), additional devices in conjunction with satellite and airborne devices have traditionally been used. For example, geodetic global navigation satellite system (GNSS) receivers on buoys in conjunction with the GNSS satellites have been used to measure centimetric sea surface wave heights. Unfortunately, however, additional devices, such as receivers on buoys, can only provide point-wise measurements.

As a result, systems and methods have been developed to improve the measurement capability of remote sensing satellite and airborne devices. For example, satellite and airborne GNSS receivers are designed to calculate a pseudorange based on the parameters (information) in the received GNSS signal. However, the calculated pseudorange can only provide height measurements on the order of tens of meters or, at best, on the order of meters. Consequently, the pseudorange cannot be used to provide centimetric height measurements.

GNSS and other types of navigation or communication satellite or airborne systems, however, also include a carrier signal. Calculating the phase of the carrier signal of such systems can be used to determine height measurements on the order of centimeters. In other words, carrier radio signals transmitted from satellites or other airborne platforms, though designed for navigation or communication purposes, can be used to sense signal propagation environments with a resolution on the order of centimeters. This is because the carrier signals contain information about the properties of the signal propagation medium. Some commonly used signals include GNSS signals (such as GPS, GLONASS, Galileo, and Beidou, etc.) and communication satellite signals.

Global navigation satellite system reflectometry (GNSS-R) is one such remote sensing application where GNSS carrier signals reflected from the earth's surface such as ocean and land cover are used to derive the properties of the reflection surface. For example, reflections from ocean surface can be used to derive ocean wind speed, roughness, wave heights, sea ice thickness, salinity, and sea-level changes; reflections from land cover can be used to infer soil moisture, snow-water-equivalent (SWE), and vegetation states.

FIG. 2 is an exemplary diagram 200 showing components of a GNSS-R system, upon which embodiments of the present teachings may be implemented. Direct line-of-sight (DLOS) GNSS signals and reflected GNSS signals from earth surface 201 are received by a GNSS-R receiver mounted on low earth orbit (LEO) satellite platform 220. The reflected GNSS signal may contain valuable information about the reflection surface, and, in the meanwhile, the reflection surface may have a significant impact on the signal characteristics. For example, the GNSS signal reflected over the ocean surface may contain information about the ocean surface height. If the ocean surface is relatively calm, the reflected GNSS signals over it tend to be coherent, and it would be possible to obtain high-precision (centimeter-level) observations of the ocean surface height.

Signal transmitters 210, 211, 212, 213, and 214 represent the GNSS satellites. The receiver of LEO satellite-based GNSS-R receiver platform 220 includes, for example, two antennas to receive the DLOS signal and the reflected signal, respectively. GNSS signals 230, 231, 232, 233, and 234 travel directly from the GNSS satellite transmitters 210, 211, 212, 213, and 214, respectively, to LEO satellite-based GNSS-R receiver platform 220. GNSS signal 230A, for example, travels from the GNSS satellite transmitter 210 to ocean surface 202 on earth 201. GNSS signal 230B results from GNSS signal 230A after being reflected by ocean surface 202 at point 240. GNSS signal 230B travels from ocean surface 202 to LEO satellite-based GNSS-R receiver platform 220. Specular point (SP) 240 represents the location where GNSS signal 230A is reflected.

The current operational GNSSs include the global positioning system (GPS), the Galileo navigation system, the global navigation satellite system (GLONASS), the BeiDou navigation satellite system, and other regional satellite navigation systems. Signal transmitters 210, 211, 212, 213, and 214 are designed to broadcast radio signals at certain frequencies. For example, current operational GPS satellites broadcast three civil signals simultaneously, i.e., L1C/A, L2C, and L5, at 1575.42 MHz, 1227.6 MHz, and 1176.45 MHz bands, respectively.

The receiver of platform 220 usually has two or more antennas, a zenith-looking antenna to receive the DLOS GNSS signals 230, 231, 232, 233, and 234 and one or several nadir-looking or horizontal-looking antennas to receive GNSS signal 230B and other reflected signals from earth 201.

The receiver of platform 220 processes GNSS signals usually at two or more frequencies, for example, GPS L1 and L2. This means the GNSS signals 230, 230A, 230B, 231, 232, 233, and 234 contain signal components at two or more frequencies. The DLOS signals 230, 231, 232, 233, and 234 are used for the precise orbit determination (POD) of LEO satellite-based platform 220.

Coherent reflection occurs when the reflection surface is smooth. If the roughness of the reflection surface is comparable to or larger than a signal wavelength, the reflection is noncoherent. Unfortunately, reflections from an ocean surface, such as surface 202, often contain very little coherent signal components, because the ocean surface is relatively rough and the GNSS carrier wavelengths are in the order of a few 10 s of centimeters. Much of the current state-of-the-art technologies work with noncoherent reflections. It is, however, the coherent signal component that enables accurate range measurement retrieval (cm-level) and high spatial and temporal resolution.

FIG. 3 is an exemplary diagram 300 showing coherent and noncoherent reflections of carrier signals from smooth and rough surfaces respectively to a receiver, upon which embodiments of the present teachings may be implemented. GNSS signals 310 are transmitted by one or more GNSS satellite transmitters (not shown) and are reflected by smooth surface 301 or rough surface 302 towards LEO satellite-based GNSS-R receiver platform 320. Smooth surface 301 produces coherent reflected signals 311, and rough surface 302 produces noncoherent reflected signals 312, for example. LEO satellite-based GNSS-R receiver platform 320 also receives DLOS signals 313 from the one or more GNSS satellite transmitters.

The low signal-to-noise ratio (SNR) and the large signal amplitude fluctuations caused by multipath interferences in the ocean reflected coherent signal impose great challenges in the receiver carrier signal processing. In addition, the carrier signal is transmitted by satellites or airborne devices moving at enormous speeds. As a result, carrier signal processing is also affected by frequency shifting due to the Doppler effect. In other words, in order to obtain centimetric height measurements from coherent carrier signal processing, a receiver must overcome challenges imposed by low signal SNR, large signal amplitude fluctuations, and signal frequency shifts due to the Doppler effect.

At least two methods of carrier signal processing were previously developed to account for low signal SNR, large signal amplitude fluctuations, and signal frequency shifts due to the Doppler effect. Both of these methods are performed by an RF receiver during the carrier tracking portion of intermediate frequency (IF) signal processing.

FIG. 4 is an exemplary block diagram 400 of a GNSS-R receiver showing the location of IF signal processing, upon which embodiments of the present teachings may be implemented. Antenna system 401 represents a multi-frequency antenna adapted to signal frequencies, such as GPS L1 and L2, with right-hand circular polarization (RHCP). Antenna system 402 represents a multi-frequency antenna adapted to signal frequencies, such as GPS L1 and L2, with left-hand circular polarization (LHCP). Antenna system 402 may also be a phased array antenna.

RF front-end 410 is configured to perform signal conditioning and down-conversions, where the signal spectrum is moved from RF to an IF or a baseband frequency. RF front-end 410 may include one or more signal down-converters (not shown) that can be configured to multiple frequency signals driven by a common local oscillator (not shown). The analog multi-frequency outputs from RF front-end 410 can be digitized and quantized in analog-to-digital converter (ADC) 420.

The output from ADC 420, i.e., the digitalized IF or baseband signals, is input to IF signal processing system 430, which is used to estimate the signal parameters of the input IF signal, decode the navigation data bits, and obtain receiver position, velocity, and time (PVT) solutions.

The output from IF signal processing system 430, i.e., signal parameter estimations of both DLOS and reflected signals, the PVT of the receiver platform, and the orbit parameters of the transmitter platform is input to the scientific parameters retrieval module 440.

Scientific parameters retrieval module 440 is used to retrieve scientific parameters, such as water level height, soil moisture, etc.

FIG. 5 is an exemplary block diagram 500 showing the IF signal processing in a GNSS-R receiver used to account for low signal SNR, large signal amplitude fluctuations, and signal frequency shifts due to the Doppler effect, upon which embodiments of the present teachings may be implemented. The IF signal processing in FIG. 5 includes three separate functions. These are direct or DLOS signal processing 510, reflected signal code phase delay and Doppler frequency modeling 520, and reflected signal processing 530.

In DLOS signal processing function 510, GNSS software receiver 512 receives DLOS GNSS signals 511, processes DLOS GNSS signals 511 using phase-lock loops (PLL) for carrier tracking and delay-lock loops (DLL) for code phase tracking, and generates parameters 513, including PVT parameters for the LEO satellite-based receiver platform, signal parameters of DLOS GNSS signals 511 (i.e., code delay, Doppler frequency, carrier phase), and decoded navigation bits, etc.

In reflected signal code phase and Doppler frequency modeling function 520, models 522 of the code delay and Doppler frequency of the reflected signal are created. Models 522 are created based on an estimated position 521 of the SP. A minimum path length method is used to estimate the SP position by minimizing the reflected path length while constraining the SP to the earth's surface. The earth's surface is modeled with a WGS84 ellipsoid or a mean sea surface (MSS) model, for example.

In reflected signal processing function 530, code tracking 531 and carrier tracking 532 are performed. In code tracking 531, pseudorandom noise codes (PRN) are shifted in the time domain and correlated with reflected signal 533 to produce code delay estimates. Based on the code delay estimates, range observation 534 is obtained (with precision in meters or tens of meters) and applied for altimetry-related GNSS-R applications.

In carrier tracking 532, the objective is to measure parameters 535 (the total carrier phase and the amplitude or $C/N_0$) of received reflected signal 533. With the carrier phase measurement, range observation at the centimeter level can be obtained. However, as described above, carrier tracking 532 is sensitive to low $C/N_0$ and rapid phase changes. In addition, received reflected signal 533 is often adversely affected by multipath scattering and the degradation from the earth's surface reflection.

One method of carrier tracking developed to account for low signal $C/N_0$, large signal amplitude fluctuations, and signal frequency shifts due to the Doppler effect is called open-loop (OL) processing. In OL processing, a carrier signal replica for the reflected signal is generated based on a Doppler model, which is based on the GNSS satellite orbit, receiver platform PVT solution, and the DLOS tracking results. The carrier signal replica is then correlated with the reflected received GNSS signal.

FIG. 6 is an exemplary block diagram 600 showing OL carrier signal tracking processing, upon which embodiments of the present teachings may be implemented. In FIG. 6, generator 610 generates a carrier signal replica based on Doppler model 522. Doppler model 522 is created in reflected signal code phase and Doppler frequency modeling function 520 of Figure for example.

Returning to FIG. 6, correlator function 620 correlates the carrier signal replica with reflected GNSS signal 630. In-phase (I) and quadrature (Q) correlation outputs are obtained from the correlation. The signal-to-noise ratio (SNR) 680 or $C/N_0$ of reflected GNSS signal 630 is estimated from the I and Q correlation outputs using SNR estimation function 670 based on a power ratio method or a signal intensity-based approach, for example.

Discriminator function 650 applies a four-quadrant discriminator to the I and Q correlation outputs to produce a measured wrapped phase 660. One of the first steps in post-processing OL outputs is unwrapping the phase. The unwrapped phase, $\phi$, is used to calculate a centimetric ocean surface height, for example. The total measured phase is obtained as the sum of the OL phase model and the phase error estimates (also referred to as the unwrapped phase) from the output of correlator 620. Removal of data bits from the I/Q correlation outputs allows for the use of the four-quadrant arctan2 function when unwrapping the phase, which eliminates the occurrence of half-cycle slips in resulting measurement.

However, the process of phase unwrapping can introduce cycle slips in the measured phase when the integer sequence is estimated incorrectly. In particular, cycle slips tend to occur due to a combination of deep signal fading and the effects of noise. Such is the case for reflected signals whose coherent component is relatively weak and therefore susceptible to interference from scattered signal components.

FIG. 7 is an exemplary pair 700 of plots showing SNR fading and corresponding cycle slip occurrences in the unwrapped phase from GPS signals that are reflected off of sea ice. In plot 710, the SNR 711 for GPS signal L1 and the SNR 712 for GPS signal L2 are plotted as a function of time. In plot 720, the unwrapped carrier phase 721 for GPS signal L1 and the unwrapped carrier phase 722 for GPS signal L2 are plotted as a function of time.

The vertical shaded bars 731 indicate signal fading in plot 710 and accompanied phase slips (or discontinuities) in plot 720 for GPS signal L1. The vertical shaded bars 732 indicate signal fading in plot 710 and accompanied phase slips in plot 720 for GPS signal L2. For example, at time 740, unwrapped carrier phase 721 for GPS signal L1 experiences an abrupt phase slip. A carrier phase slip, such as the slip at time 740, results in the accumulation of discrete integer-cycle biases in the measured phase.

Geooptics Inc. launched the community initiative for continuing earth radio occultation (CICERO) constellation of LEO satellites, in 2018, for GNSS atmospheric radio occultation. CICERO data processing uses a simple method to correct the cycle slips in the phase measurement for total electron (TEC) observation. For example, if the phase measurement jumps more than 2 TEC units in a single second, all values after the jump are adjusted by a constant bias to erase the jump.

Common approaches to cycle slip correction, such as the simple method used in CICERO data processing, can only correct some obvious cycle slips. These approaches do not use information from the measured SNR.

As described above, OL signal tracking is a robust technique. Most existing applications process GNSS-R coherent components using some form of OL tracking and post-processing. Unfortunately, this approach can produce large errors and numerous cycle slips in the carrier phase measurements due to low SNR and amplitude fading.

As a result, additional systems and methods are needed to reduce both cycle slips and noise in phase measurements obtained from OL carrier signal tracking.

SUMMARY

A receiver, method, and computer program product are disclosed for reducing cycle slips and noise in phase measurements of a reflected RF carrier signal, in accordance with various embodiments. The receiver includes one or more antennas, circuitry, and a processor.

The one or more antennas receive a DLOS RF signal component and an RF signal component of an RF carrier signal. The RF signal component is reflected from a point on the surface of the earth.

Circuitry converts the DLOS RF signal component to a digital DLOS IF signal and converts the RF signal component to a digital reflected IF signal.

The processor performs OL tracking with SCANF, for example. The processor generates a reference signal using the digital DLOS IF signal. The processor correlates the reference signal with the digital reflected IF signal to produce correlation results. The processor calculates an estimated $C/N_0$ and an estimated phase, $\phi$, for the digital reflected IF signal from the correlation results. The processor applies a filter to the estimated $\phi$ to produce an estimated filtered phase, $\phi_{SCANF}$. The filter is adapted to filter the estimated $\phi$ using the estimated $C/N_0$ to reduce cycle slips and noise in the estimated $\phi_{SCANF}$.

These and other features of the applicant's teachings are set forth herein.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

The phrases "in various embodiments," "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

BRIEF DESCRIPTION OF THE DRAWINGS

The skilled artisan will understand that the drawings, described below, are for illustration purposes only. The drawings are not intended to limit the scope of the present teachings in any way.

Figure 1:
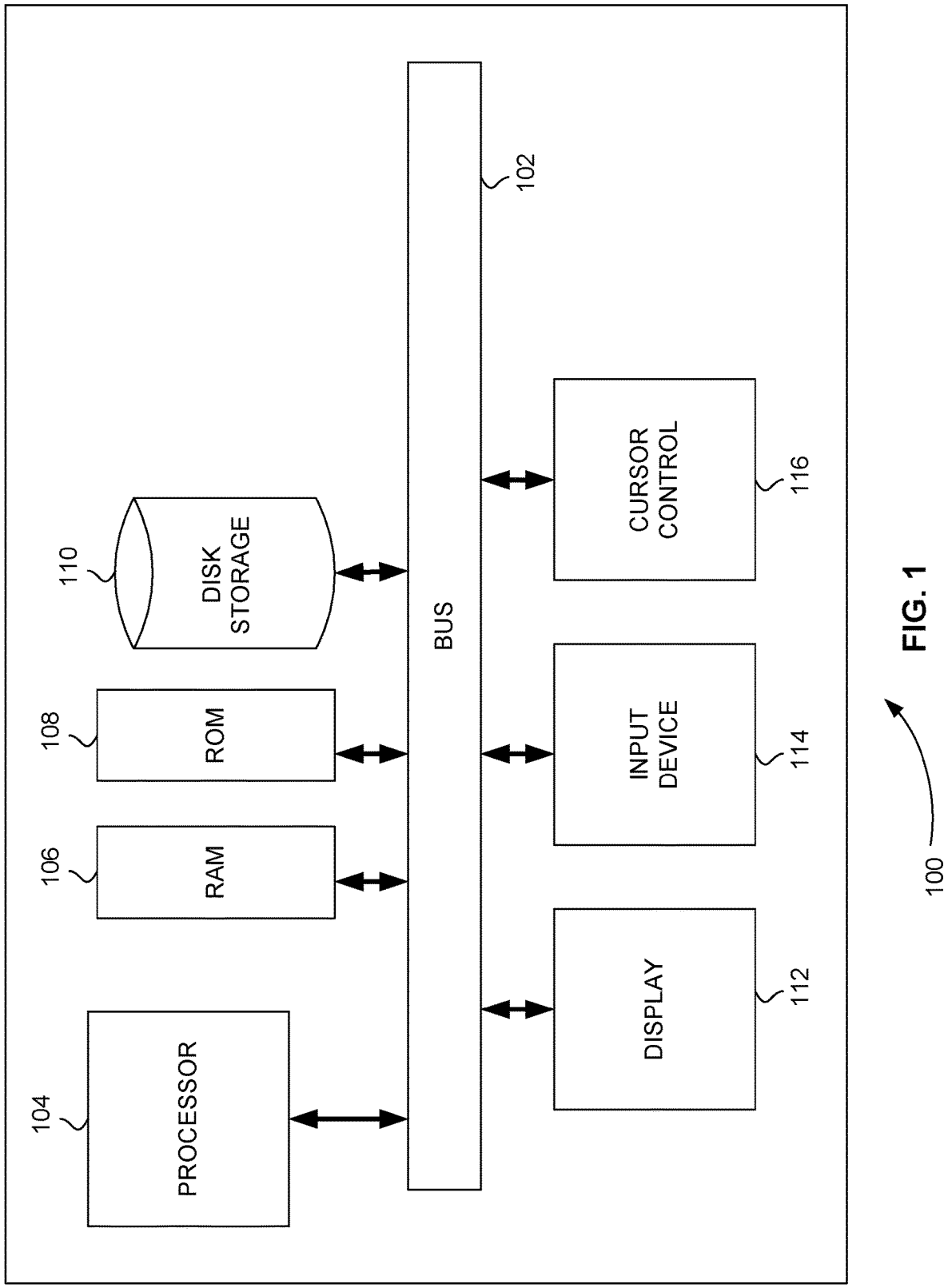
FIG. 1 is a block diagram that illustrates a computer system, upon which embodiments of the present teachings may be implemented.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read-only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The terms "computer-readable medium" or "computer program product" as used herein refer to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer-readable media or computer program products may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium or a computer program product includes a compact disc read-only memory (CD-ROM) as is known in the art for storing software. The computer-readable medium or computer program product is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing the present teachings. Additionally, the described implementation includes software but the present teachings may be implemented as a combination of hardware and software or in hardware alone. The present teachings may be implemented with both object-oriented and non-object-oriented programming systems.

Cycle Slip and Noise Reduction in Open-Loop Phase Measurements

As described above, radio signals reflected from the earth's surface can be used to derive the properties of the reflection surface. The carrier phase measurement from surface-reflected radio signals enables high-precision remote sensing applications, such as sea level and sea ice monitoring, terrain topography, snow-water-equivalent (SWE) measurements, etc. However, the carrier phase measurement can only be obtained from coherent reflections. Coherent reflection occurs when the reflection surface is relatively smooth, i.e., if the roughness of the reflection surface is comparable to or larger than the signal wavelength, the reflection is non-coherent. For example, few studies have shown coherent reflection observations of GNSS signals over open ocean from a space-borne platform. This is because the ocean surface is relatively rough. Only a small amount of coherent signal exists in the reflected signals at low-grazing angles when the ocean surface is relatively calm. In addition, the reflected signal usually has a low SNR and large signal amplitude fluctuations caused by multipath interferences, which impose great challenges in the receiver carrier signal processing.

Most of the current GNSS-R missions and experiments follow an OL signal tracking technique which was originally proposed for radio occultation. In the OL signal tracking technique, the received reflected radio signal is correlated with the reference signal which is generated based on a specular reflection model. Through specular reflection modeling, the range and range rate of the reflected signal transmission path are estimated based on the transmitter PVT (usually obtained from orbit parameters, such as GNSS almanac and ephemeris) and receiver PVT (usually obtained from a navigation processor). The range and range rate from the specular reflection model are converted to code phase and Doppler frequency, based on which the reference signal is generated. The carrier phase in the reference signal is the accumulated Doppler frequency, in radians, over time. A carrier phase discriminator is applied to measure the carrier phase error of the reference signal. Then, the carrier phase-based range measurement is obtained by adding the unwrapped carrier phase error measurement to the accumulated Doppler frequency.

However, the process of phase unwrapping can introduce cycle slips in the measured phase when the integer sequence is estimated incorrectly. In particular, cycle slips tend to occur due to a combination of deep signal fading and the effects of noise. Such is the case for reflected signals whose coherent component is relatively weak and therefore susceptible to interference from scattered signal components. Consequently, OL carrier signal tracking can produce large errors and numerous cycle slips in the carrier phase measurements due to low SNR and amplitude fading.

As a result, additional systems and methods are needed to reduce both cycle slips and noise in phase measurements obtained from OL carrier signal tracking.

In various embodiments, a method of simultaneous cycle slip and noise filtering (SCANF) is applied to phase measurements obtained from OL carrier signal tracking. The SCANF method is designed to estimate the full phase measurement with minimal contributions from cycle slips and scattering noise. It uses a Kalman filter (KF) formulation with adaptations to make it effective for mitigating cycle slips. Specifically, the KF is formulated to use information from the measured SNR, which is important for correcting the cycle slips caused by signal amplitude fading.

Figure 7:
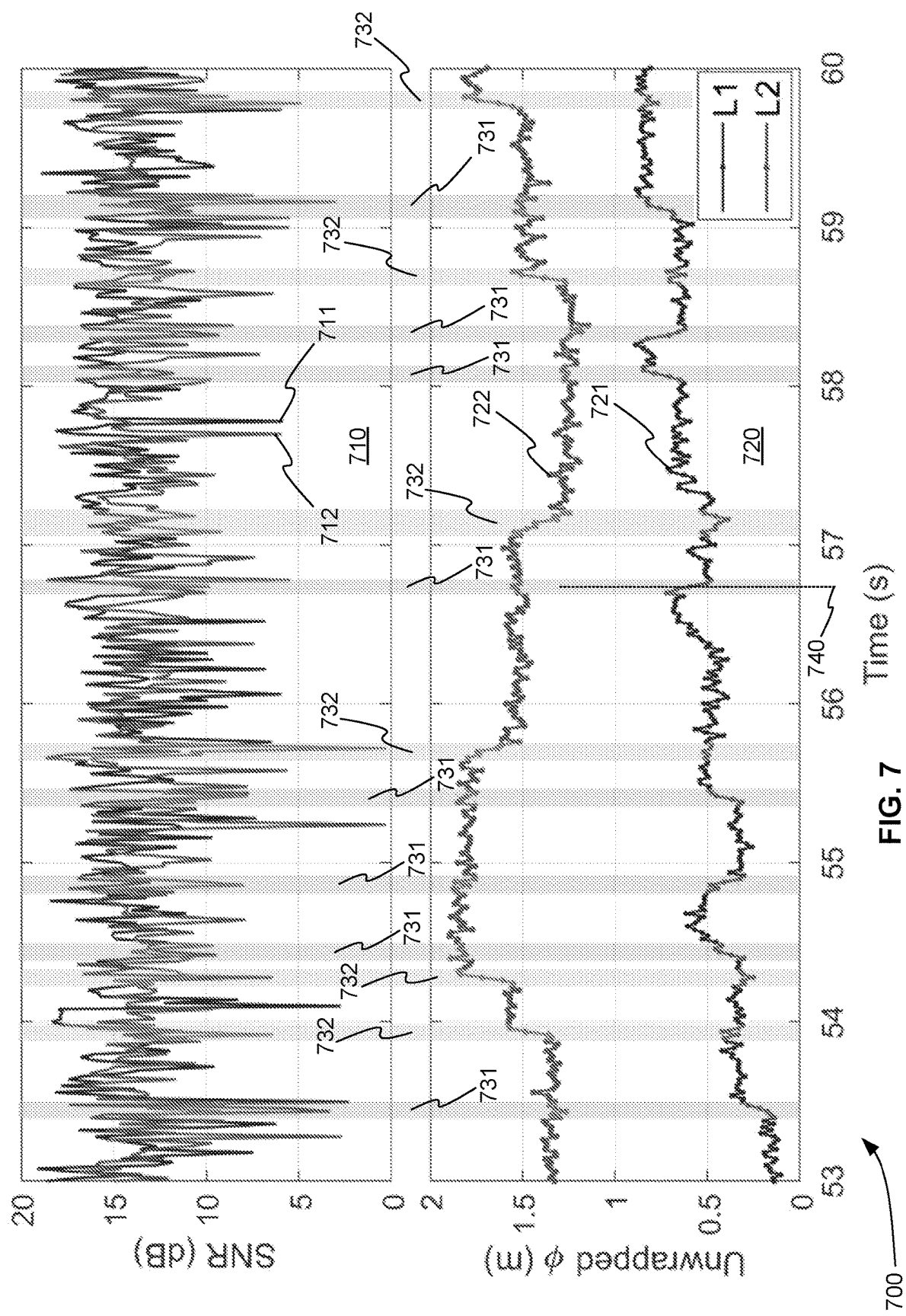
FIG. 7 is an exemplary pair of plots showing SNR fading and corresponding cycle slip occurrences in the unwrapped phase from GPS signals that are reflected off of sea ice.

As shown in FIG. 7, cycle slips occur during fades in the signal amplitude and the slips for L1 and L2 signals do not necessarily happen simultaneously. To some extent, the SCANF method is analogous to a low-pass filter that removes the fast phase changes due to cycle slips.

Figure 4:
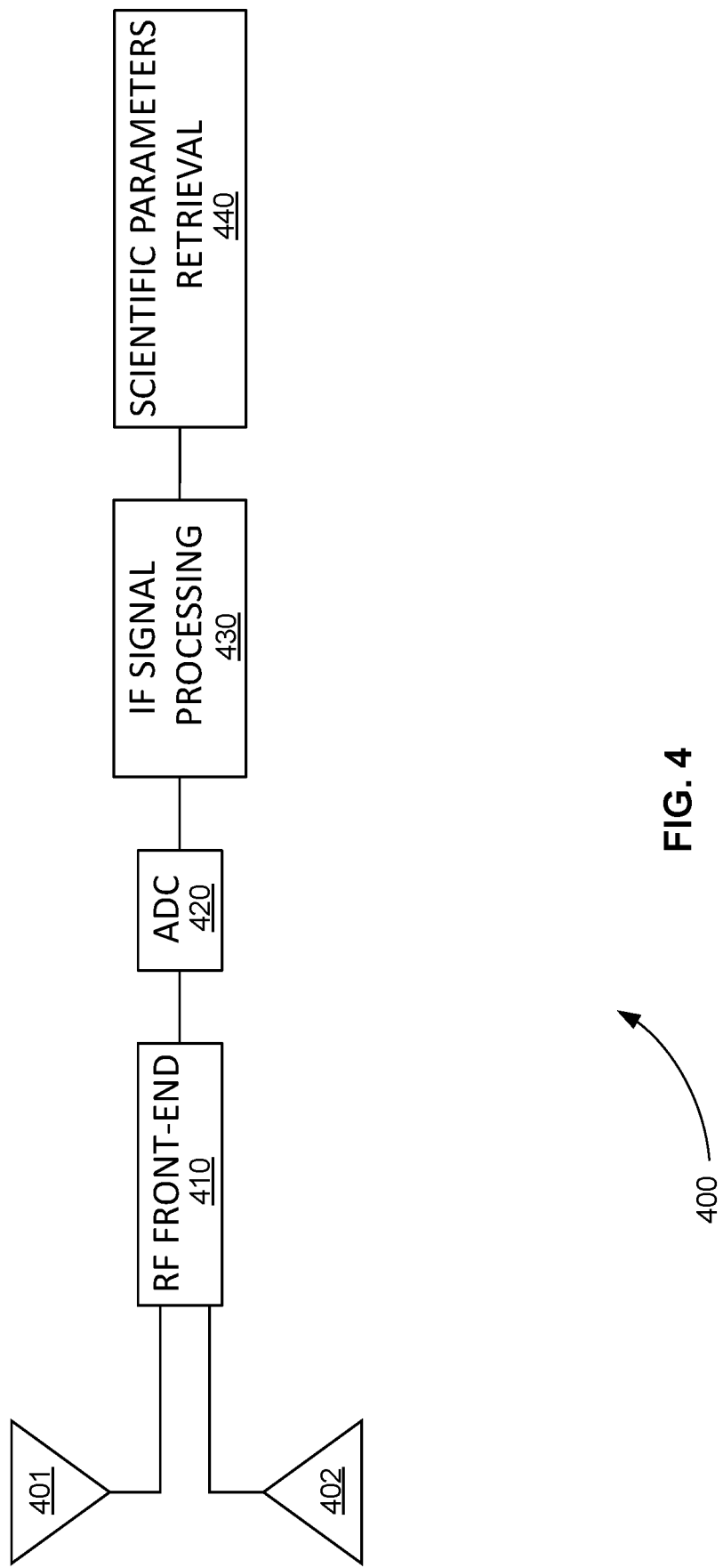
FIG. 4 is an exemplary block diagram of a GNSS-R receiver showing the location of IF signal processing, upon which embodiments of the present teachings may be implemented.
Figure 5:
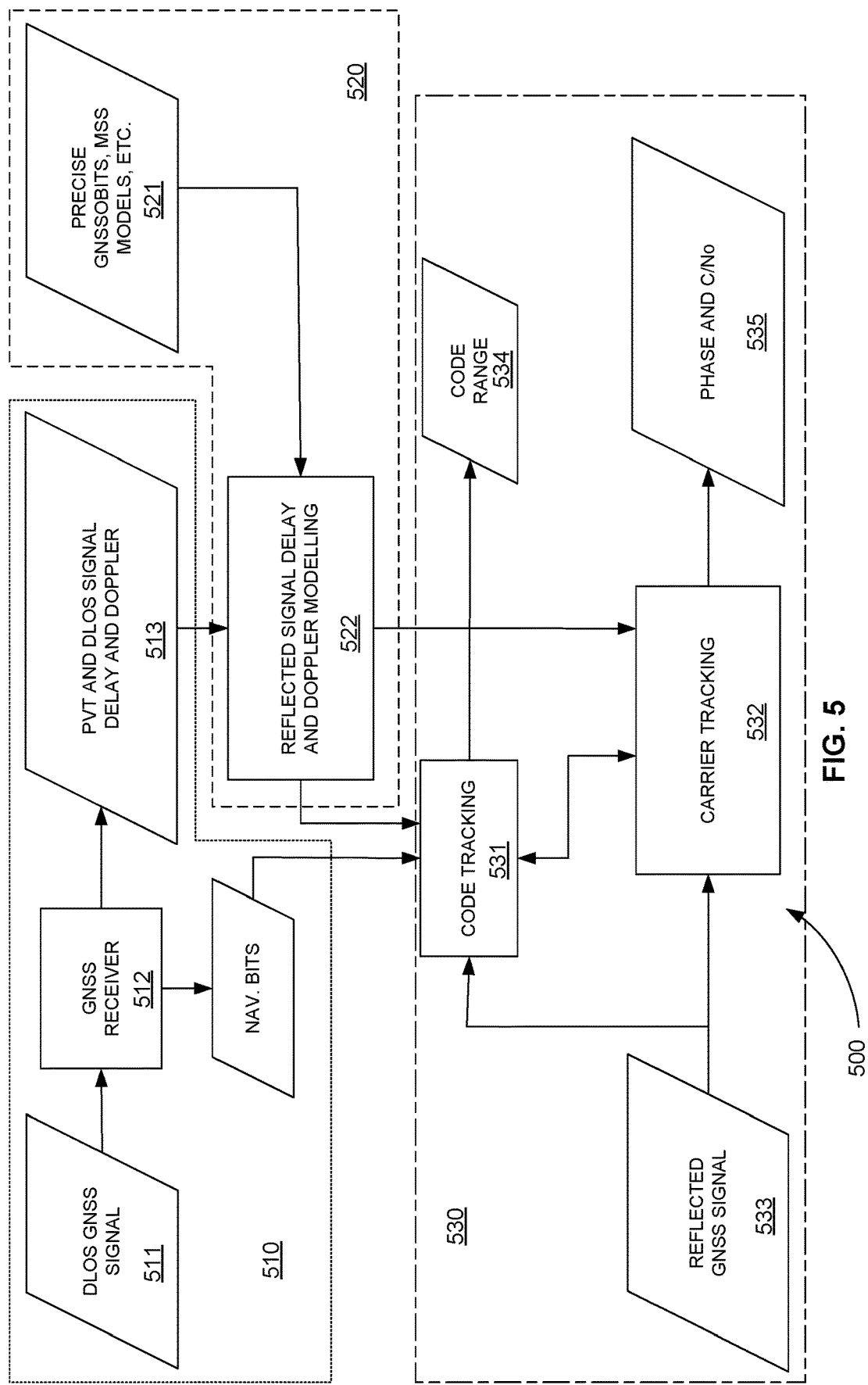
FIG. 5 is an exemplary block diagram showing the IF signal processing in a GNSS-R receiver used to account for low SNR, large signal amplitude fluctuations, and signal frequency shifts due to the Doppler effect, upon which embodiments of the present teachings may be implemented.
Figure 6:
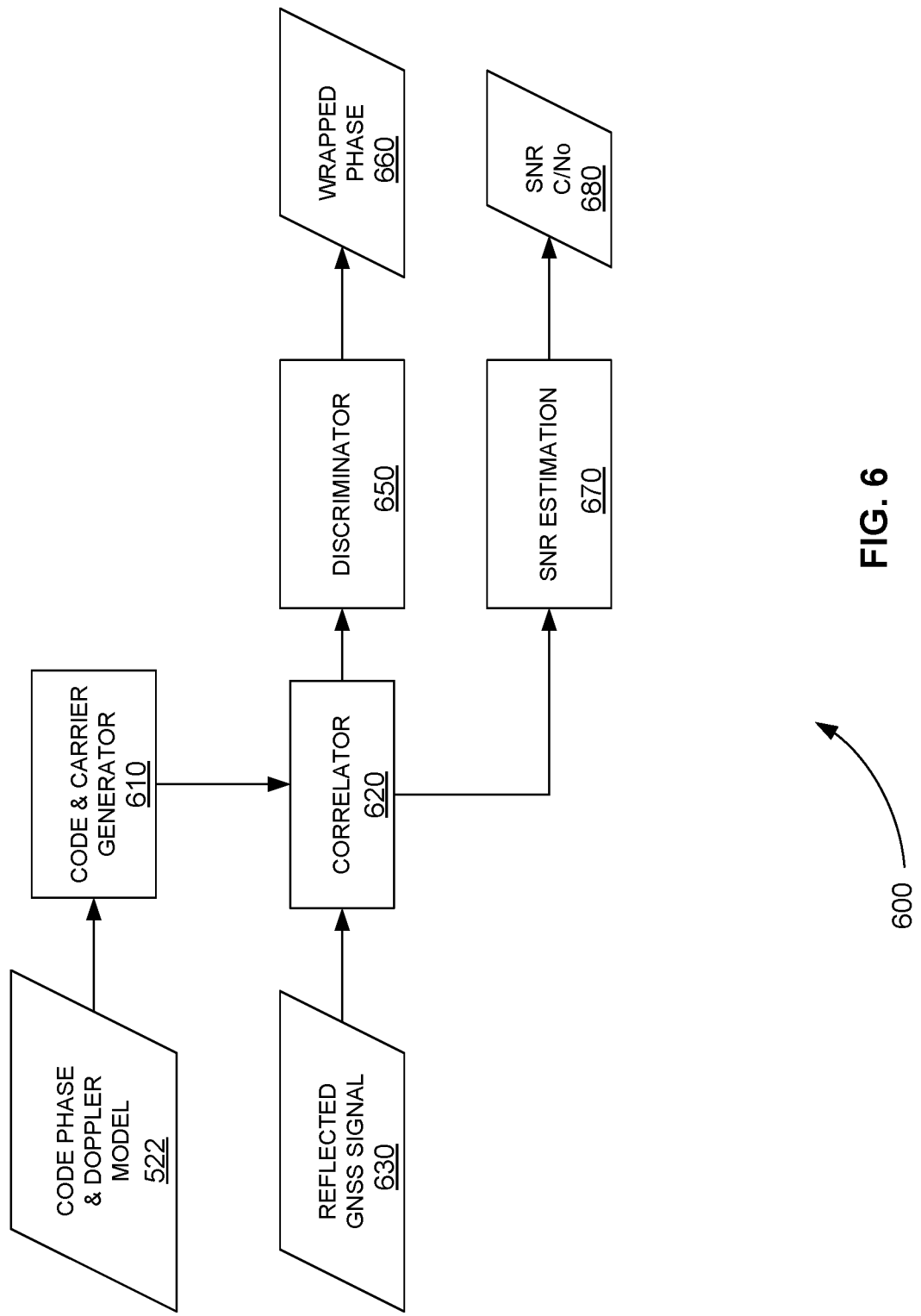
FIG. 6 is an exemplary block diagram showing OL carrier tracking processing, upon which embodiments of the present teachings may be implemented.
Figure 8:
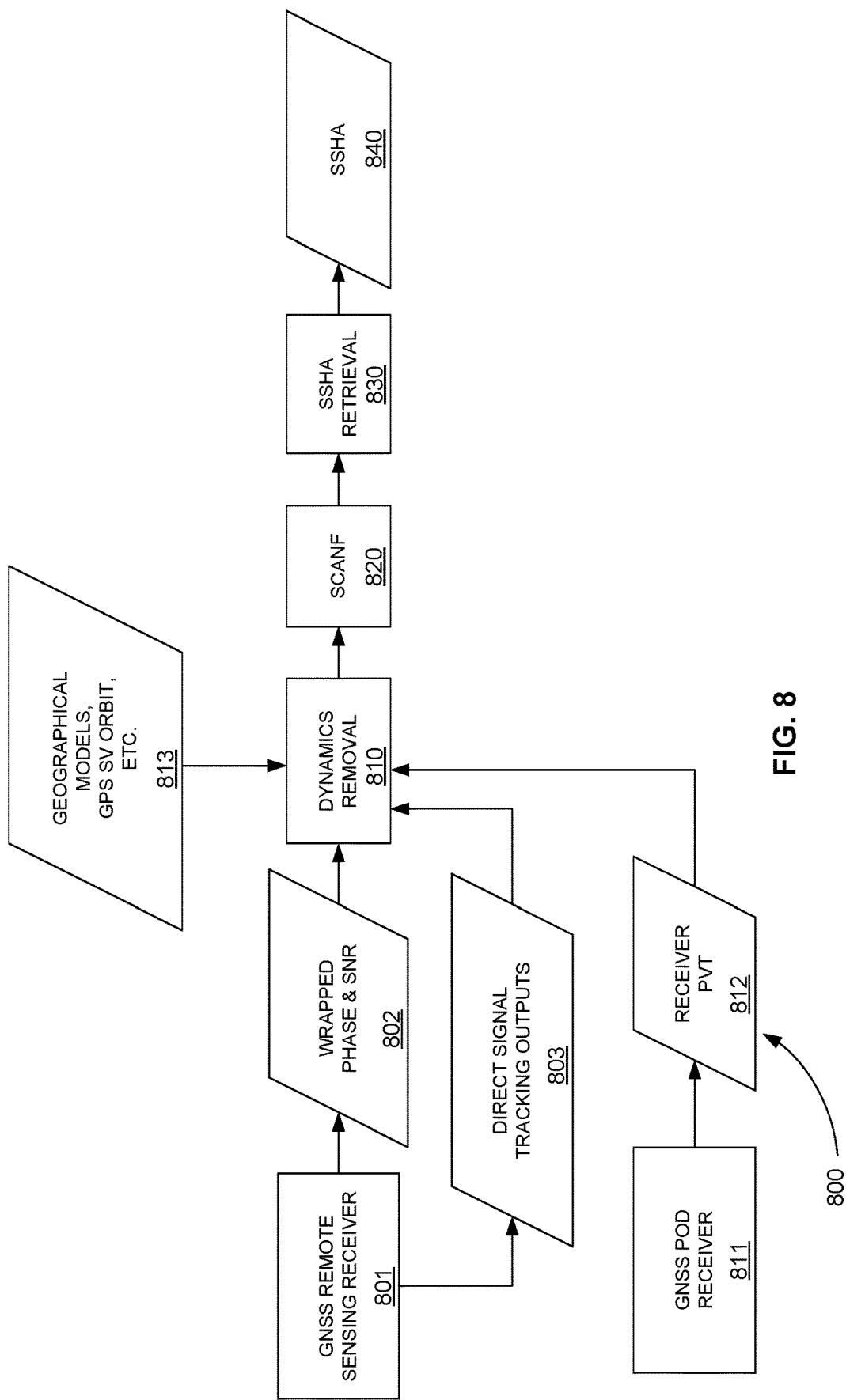
FIG. 8 is an exemplary block diagram showing a system used to reduce both cycle slips and noise in phase measurements obtained from OL carrier signal tracking, in accordance with various embodiments.

FIG. 8 is an exemplary block diagram 800 showing a system used to reduce both cycle slips and noise in phase measurements obtained from OL carrier signal tracking, in accordance with various embodiments. A receiver 801 is used to provide wrapped phase and SNR measurements 802. Receiver 801 is, for example, a GNSS-R receiver, such as the receiver of FIG. 4. Receiver 801 produces wrapped phase and SNR measurements 802 using OL carrier signal tracking processing. An exemplary method of OL carrier signal tracking processing is depicted in FIG. 6.

Note that although various embodiments are described in relation to GNSS-R, these embodiments are not limited to GNSS-R. For example, the various embodiments described herein are equally applicable to GNSS radio occultation. GNSS radio occultation is described, for example in U.S. Pat. No. 7,912,422, which is incorporated herein by reference in its entirety.

Returning to FIG. 8, cycle slips and noise in phase measurements 802 are reduced using SCANF method 820. However, in various embodiments, before applying SCANF method 820, phase dynamics are removed in dynamic removal method 810. In other words, in order to improve SCANF method 820, certain components of the phase variation that can be estimated in advance are removed. This removal is achieved by using a more precise version of the phase model than the version used in the original OL carrier signal tracking processing.

For example, a PVT estimate 812 of receiver 801 is obtained from post-processed POD solution 811 of receiver 801. An estimate of the SP location is also computed based on precise satellite positions and geographical models 813. Geographical models 813 can include, but are not limited to, an MSS model and a tide model.

The removal of certain components of the phase variation produces a more precise version of the phase model. After removing this model from the unwrapped phase, the only remaining variable phase components are due to the ionosphere, troposphere, SP modeling error (in this case, due to the sea surface height anomaly (SSHA)), and any other unmodeled effects, including cycle slips. In other words, after unwrapping the phase measurement from wrapped phase measurement 802 and removing the more precise version of the phase model from the unwrapped phase, residual phase measurements for L1 and L2 signals are provided to SCANF method 820.

Unwrapping the phase measurement from wrapped phase measurement 802 is not shown in FIG. 8, but may be included in dynamics removal method 810, SCANF method 820, or a separate method (not shown). For example, dynamics removal method 810 can perform unwrapping using direct signal tracking (or DLOS) outputs 803.

As described above, SCANF method 820 applies a KF formulation. The residual phase measurements for the L1 and L2 signals are collected into a measurement vector y. The KF model is then y[k]=Hx[k]+B[k]+v[k], where H is the state transition model, B is the control-input model, and v is the process noise. Also as described above, the KF formulation includes adaptations to make it effective for mitigating cycle slips. Specifically, these adaptations include: 1) a measurement model with an adaptive noise covariance based on signal carrier-to-noise density ratio $C/N_0$; 2) a phase dynamics model with a carefully chosen process noise covariance, and 3) a re-estimation of the integer-cycle bias sequence that occurred during the original phase unwrapping.

In regard to adaptation 1), process noise v is, for example, a zero mean Gaussian white noise with a covariance matrix R. Covariance matrix R is then adapted to include a time-dependent measurement variance of the i-th signal that is based on instantaneous estimates of the signal $C/N_0$ and the OL tracking integration time. Note that when the signal fades and $C/N_0$ becomes small, the variances in R become large, which means the model will tolerate larger deviations between the measured phase residuals in y and the filtered phase in x.

In regard to adaptation 2), the state vector x is updated through a discrete time dynamics model x[k+1]=Ax[k]+w[k], where A is a state transition matrix and w is a dynamics noise vector with covariance matrix Q. Aside from the impact of cycle slips, the phase residuals of signals L1 and L2 only have contributions from atmospheric and unmodeled effects. As a result, covariance matrix Q is modeled using power spectral densities of the frequency noise $q_s$, $q_i$, and $q_d$ that represent the tropospheric effects and reflection from the sea surface, the ionospheric effects on the L1 signal, and the difference between L1 and L2 frequency noises due to the ionosphere, respectively. Note that the $q_d$ term is not independent of $q_i$, but rather is obtained as a function of $q_i$. Heuristically, for example, $q_s$ is chosen to be $1 \times 10^{-5}$ m$^2$/s$^3$, and $q_i$ is chosen to be $1 \times 10^{-6}$ m$^2$/s$^3$. Most importantly the process noise variance is made large enough to allow the filter to easily track atmospheric and SSHA phase dynamics, but is also small enough to not easily track phase variations due to cycle slips.

In regard to adaptation 3), SCANF method 820 estimates offsets due to cycle slips just after the state time-step update. The prior state estimate is used to find the integer solutions for minimizing the prior measurement residual. When no cycle slip is occurring, the residual y[k]−Hx[k] is small and B[k] remains constant. When a cycle slip does occur and the measurements vary sufficiently from the predicted filter state, the estimate of B[k] is updated to compensate for the bias introduced by the cycle slip. Aside from this discrete bias estimation, SCANF method 820 then proceeds with the normal KF steps.

SCANF method 820 produces filtered phase measurements containing only atmospheric, SSHA, and small unmodeled components, as well as some unknown biases. SSHA 840 describes deviations of the actual sea surface height from the MSS and tide models at the SP. In order to obtain phase variation due to SSHA 840, the ionospheric and tropospheric errors are removed in SSHA retrieval function 830.

Figure 2:
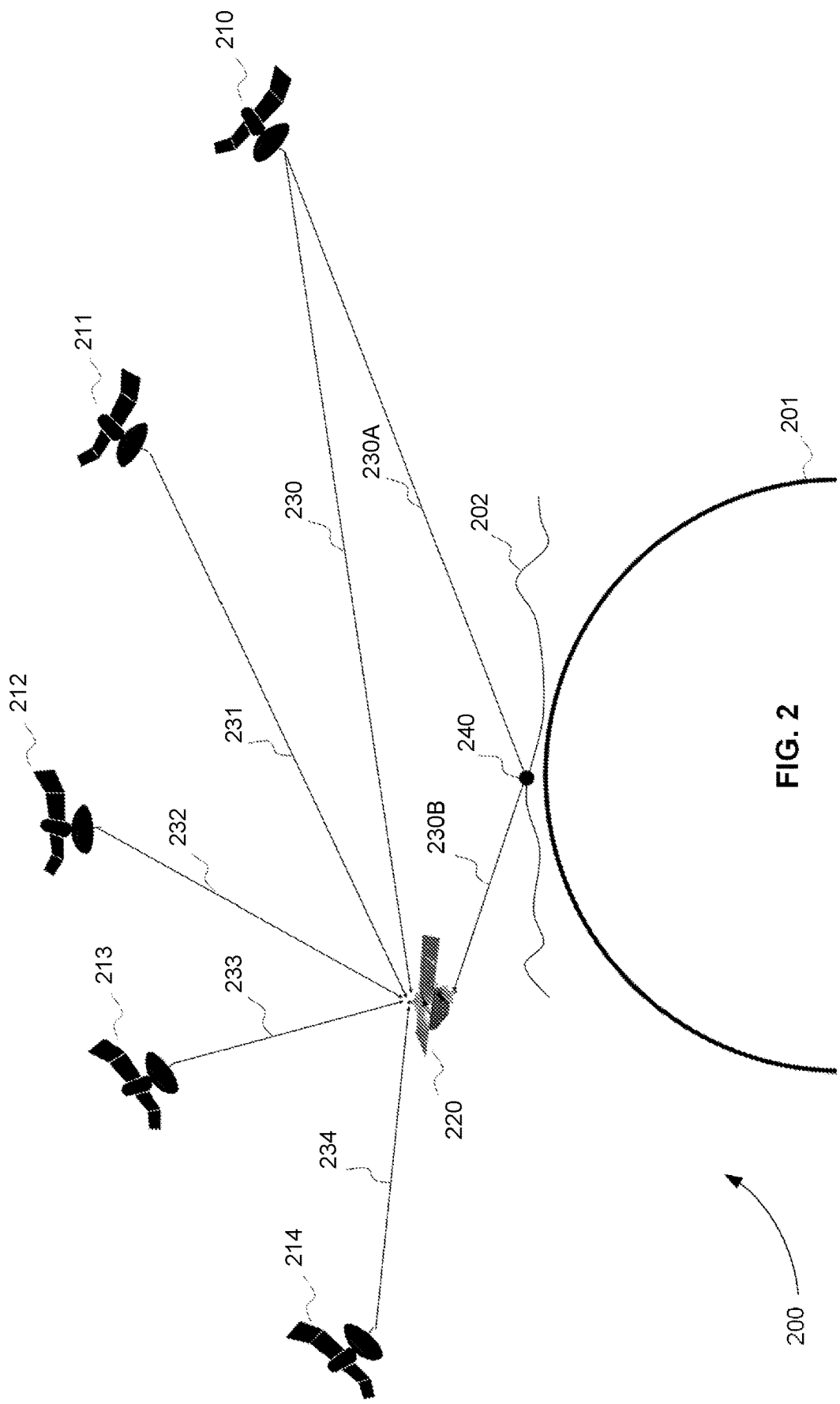
FIG. 2 is an exemplary diagram showing components of a GNSS-R system, upon which embodiments of the present teachings may be implemented.
Figure 3:
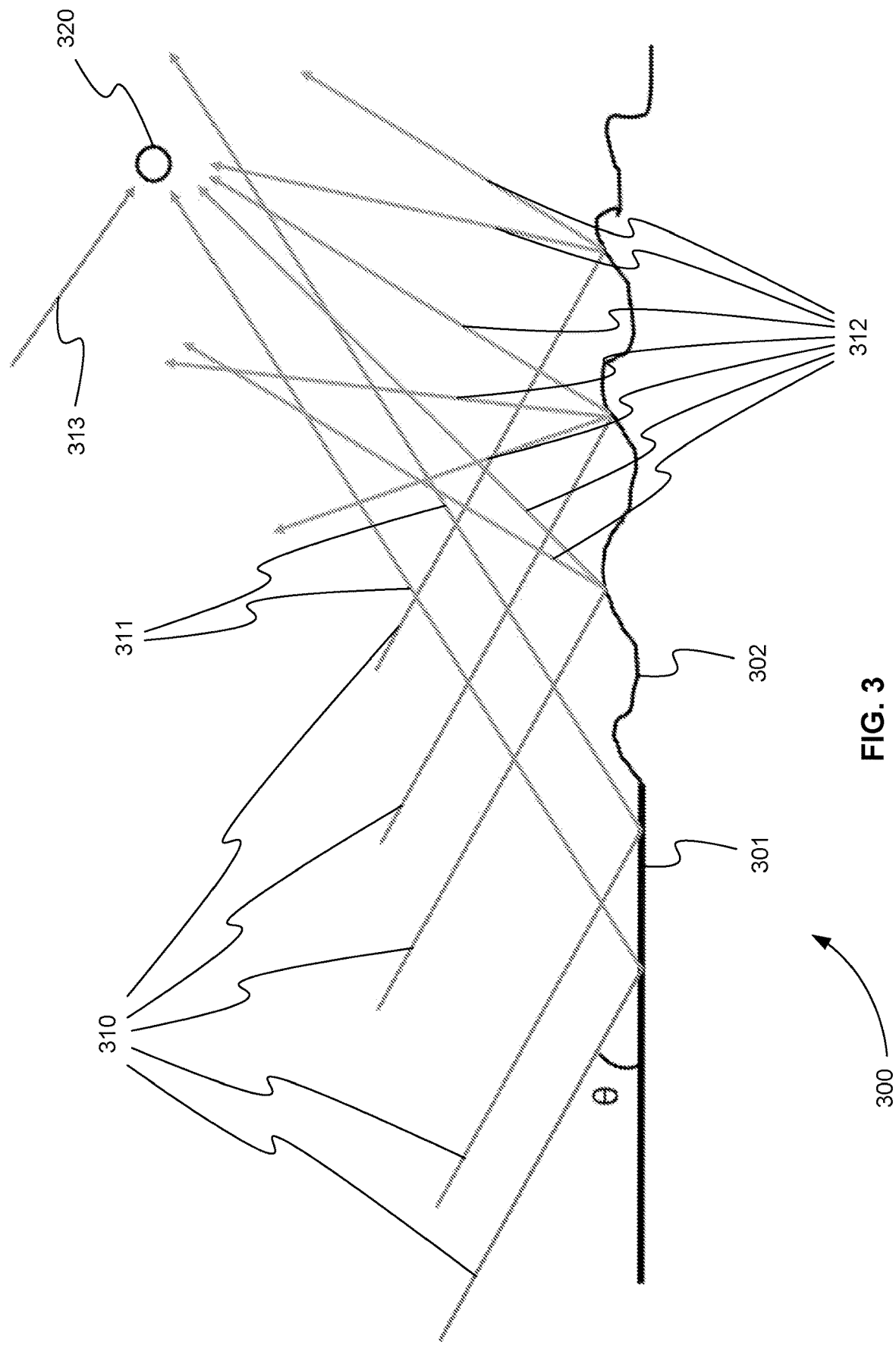
FIG. 3 is an exemplary diagram showing coherent and noncoherent reflections of carrier signals from smooth and rough surfaces respectively to a receiver, upon which embodiments of the present teachings may be implemented.
Figure 9:
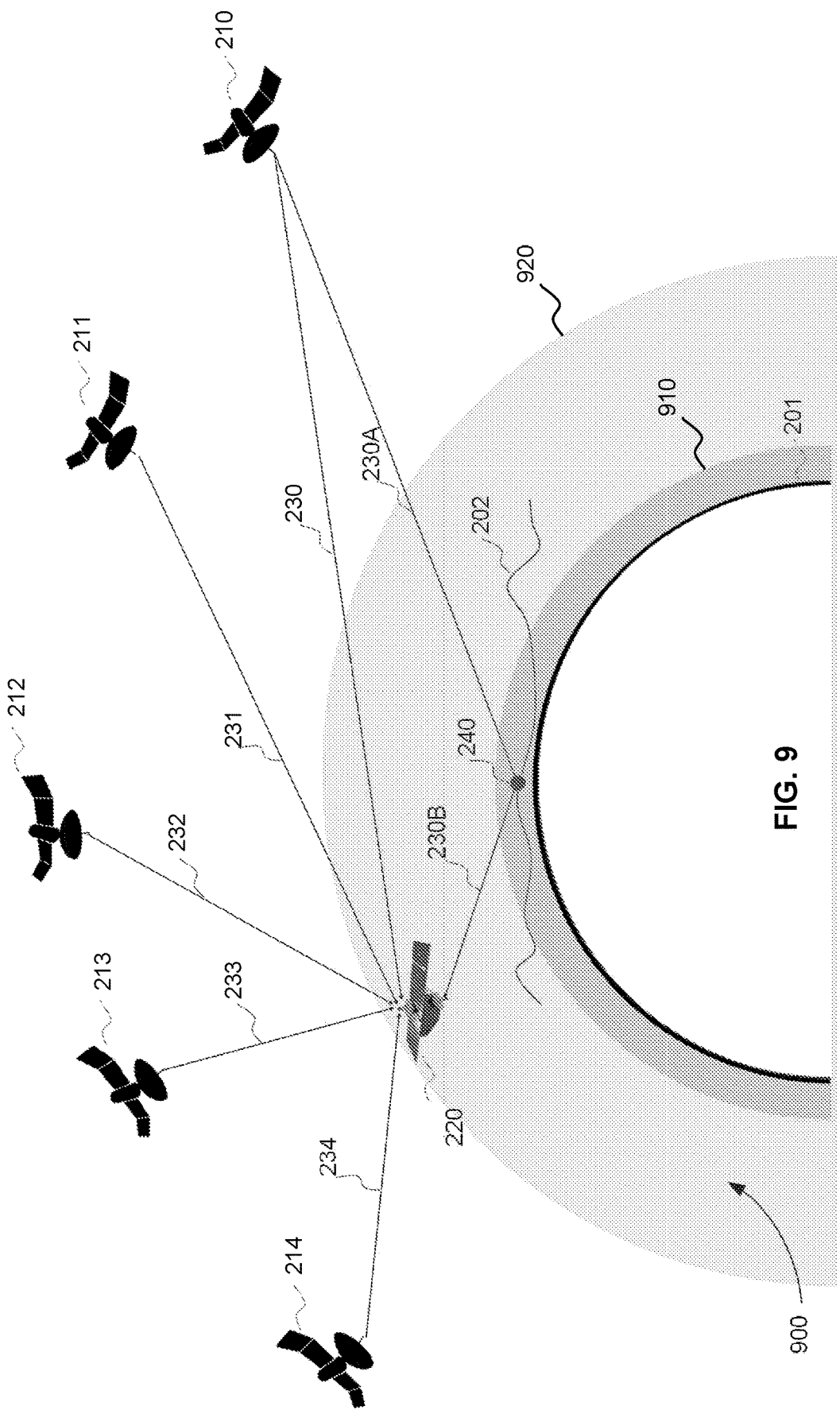
FIG. 9 is an exemplary diagram showing components of the GNSS-R system of FIG. 2 relative to the troposphere and ionosphere, in accordance with various embodiments.

FIG. 9 is an exemplary diagram 900 showing components of the GNSS-R system of FIG. 2 relative to the troposphere and ionosphere, in accordance with various embodiments. In FIG. 9, boundary 910 delimits the outer edge of the troposphere. The troposphere extends on the order of 10 km above earth surface 201. Boundary 920 delimits the inner edge of the ionosphere. The ionosphere begins about 80 km above earth surface 201 and extends to about 1,000 km above earth surface 201. FIG. 9 shows that the components of the GNSS-R system of FIG. 2 send and receive signals within and through both the troposphere and the ionosphere.

Figure 10:
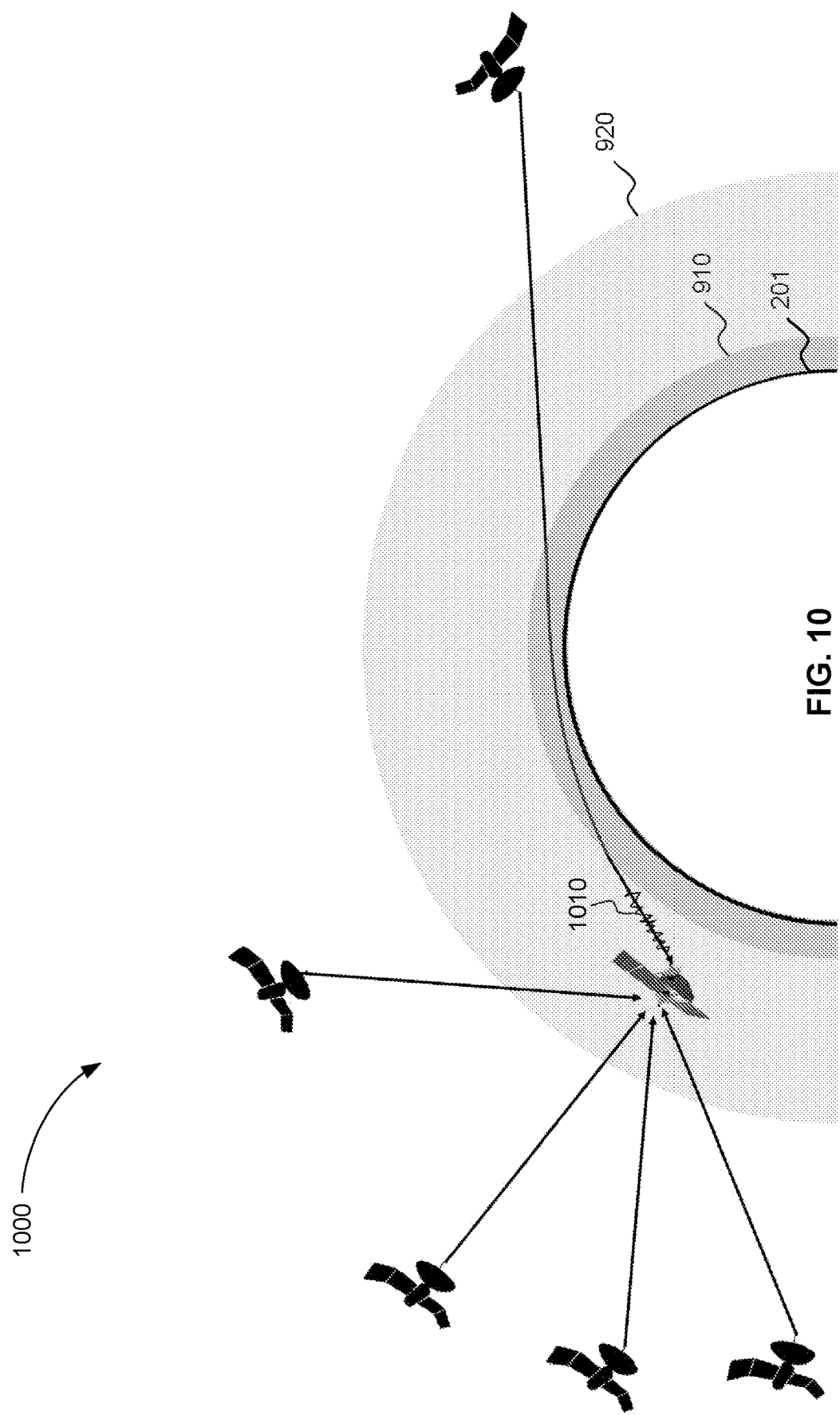
FIG. 10 is an exemplary diagram showing a configuration of the components of the GNSS-R system of FIG. 2 in which troposphere scintillation causes GNSS radio occultation, in accordance with various embodiments.

FIG. 10 is an exemplary diagram 1000 showing a configuration of the components of the GNSS-R system of FIG. 2 in which troposphere scintillation causes GNSS radio occultation, in accordance with various embodiments. As in FIG. 9, boundary 910 delimits the outer edge of the troposphere above earth surface 201. Similarly, boundary 920 delimits the inner edge of the ionosphere above earth surface 201. In FIG. 10, signal 1010 experiences amplitude fades and phase fluctuations caused by troposphere scintillation.

Figure 11:
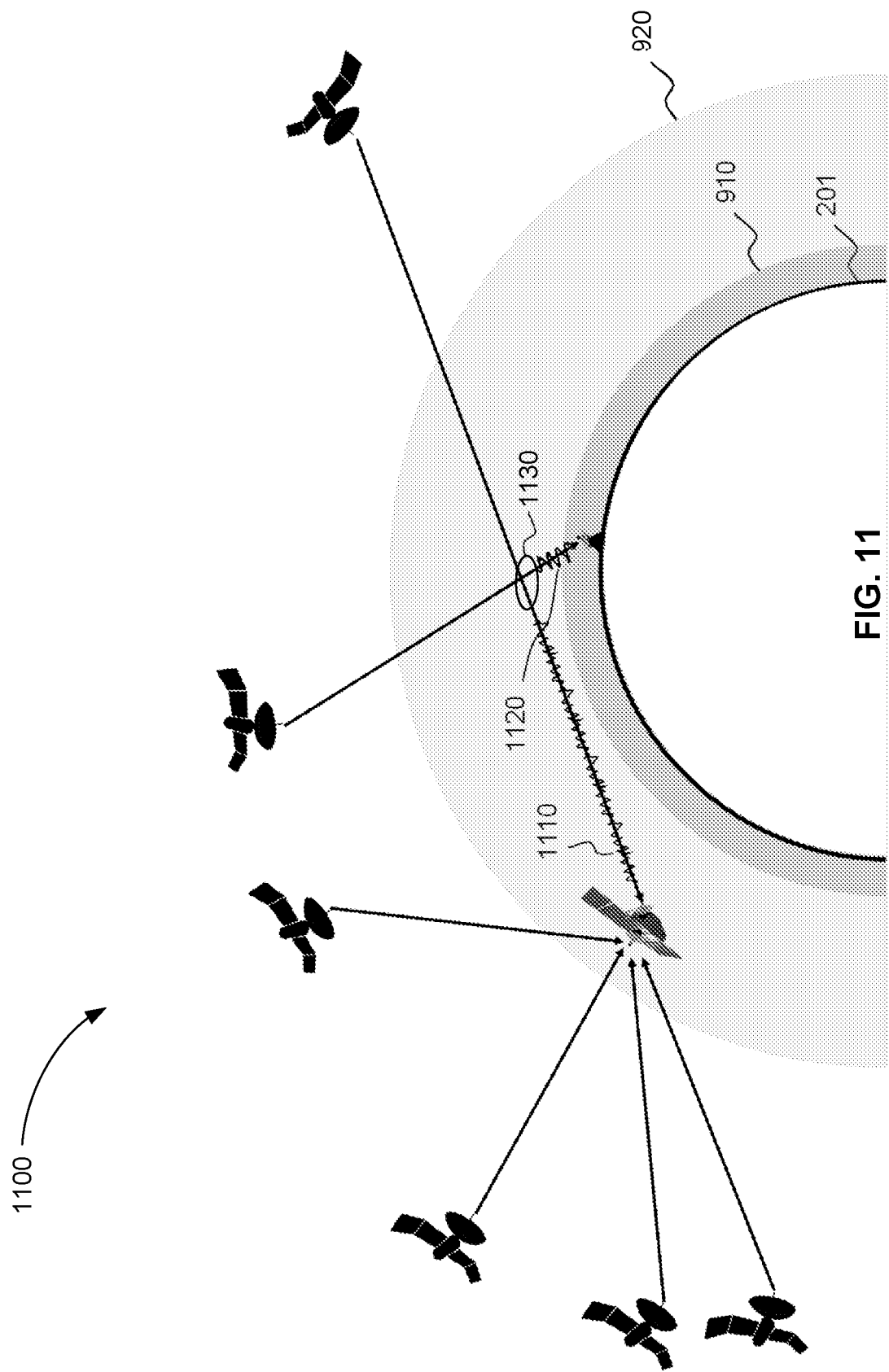
FIG. 11 is an exemplary diagram showing a configuration of the components of the GNSS-R system of FIG. 2 in which ionosphere scintillation causes GNSS radio occultation, in accordance with various embodiments.

FIG. 11 is an exemplary diagram 1100 showing a configuration of the components of the GNSS-R system of FIG. 2 in which ionosphere scintillation causes GNSS radio occultation, in accordance with various embodiments. Again, as in FIG. 9, boundary 910 delimits the outer edge of the troposphere above earth surface 201. Similarly, boundary 920 delimits the inner edge of the ionosphere above earth surface 201. In FIG. 11, signals 1110 and 1120 experience amplitude fades and phase fluctuations caused by ionosphere scintillation. Ionosphere plasma structures 1130, for example, can affect signals 1110 and 1120.

Returning to FIG. 8, SSHA retrieval function 830 is used to remove phase errors caused by the troposphere and ionosphere. First, the ionosphere-free combination of the filtered L1 and L2 phase measurements is used to eliminate the ionosphere variation. Next, the tropospheric delay is computed by mapping the estimated zenith tropospheric delay along both slant paths of the reflected signal. The initial Zenith delay is set to five meters, for example, and then refined using a least-squares grid search to find the value that minimizes the residual phase. Finally, having isolated the SSHA phase variations, $\Delta\phi_{SSHA}$, the actual SSHA 840 (to within some bias), $\Delta H$, is obtained using $\Delta\phi_{SSHA}(t_k)=\Delta H(t_k)2\sin(\theta(t_k))$, where $\theta$ is the elevation angle of the GNSS satellite at the SP. Note that while there is an estimated bias in the SSHA retrieval (due to unestimated carrier ambiguities), only the variation due to SSHA is used to validate processing.

The carrier phase obtained using SCANF method 820 was compared to the unwrapped carrier phase measurement and the carrier phase obtained using a simple correction method. The GNSS data used was recorded over Hudson Bay. At the time, Hudson Bay was frozen over. The elevation angle at the SP decreased from 18.6° to 13.1° along the SP track of the reflection.

Figure 12:
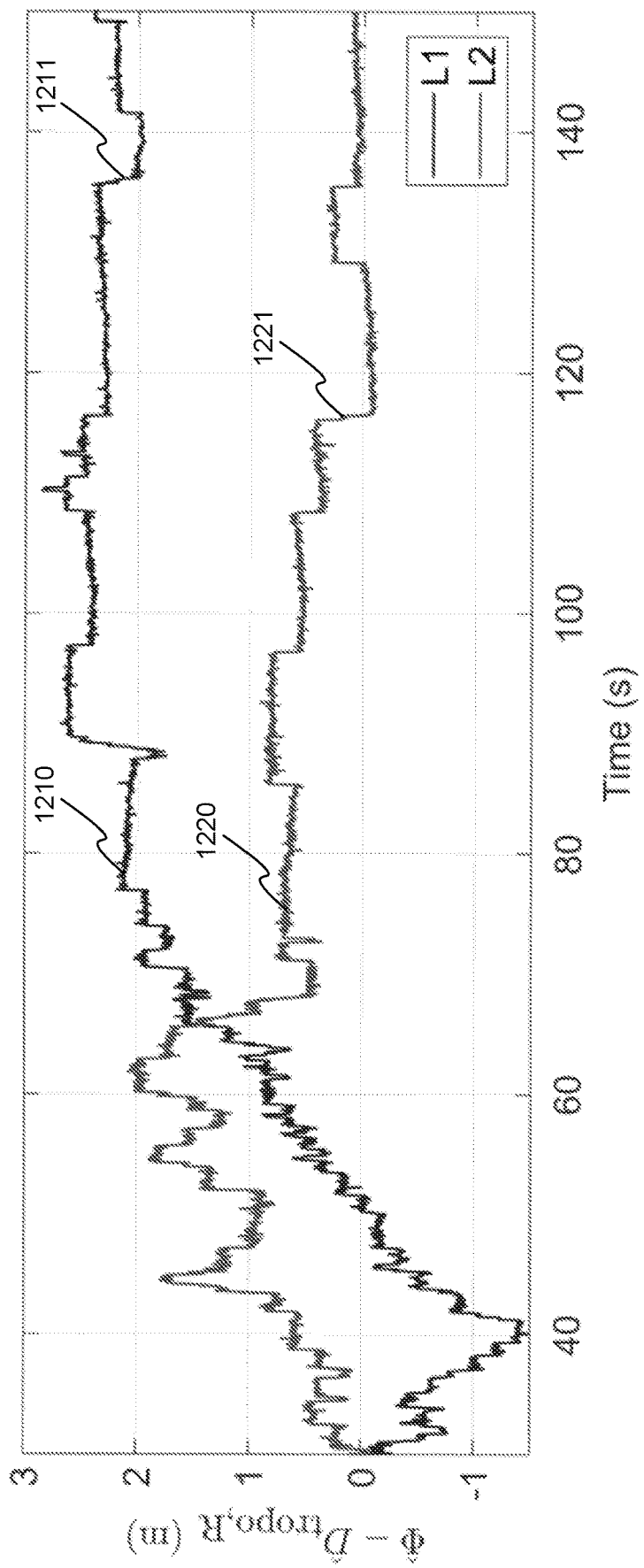
FIG. 12 is an exemplary plot showing cycle slip occurrences in the unwrapped carrier phase measurement obtained from GPS signals reflected from the sea ice of Hudson Bay.

FIG. 12 is an exemplary plot 1200 showing cycle slip occurrences in the unwrapped carrier phase measurement obtained from GPS signals reflected from the sea ice of Hudson Bay. In FIG. 12, both unwrapped carrier phase measurement 1210 for the L1 signal and unwrapped carrier phase measurement 1220 for the L2 signal exhibit numerous cycle slips. For example, unwrapped carrier phase measurement 1210 for the L1 includes cycle slip 1211, and unwrapped carrier phase measurement 1220 for the L2 includes cycle slip 1221 L1. Again, these phase measurements consist of contributions from SSHA, ionospheric and tropospheric effects, and noise. However, due to the low $C/N_0$ and signal amplitude fades, numerous cycle slips are observed with an accumulation of up to 3 meters of error over the 120-second segment.

Figure 13:
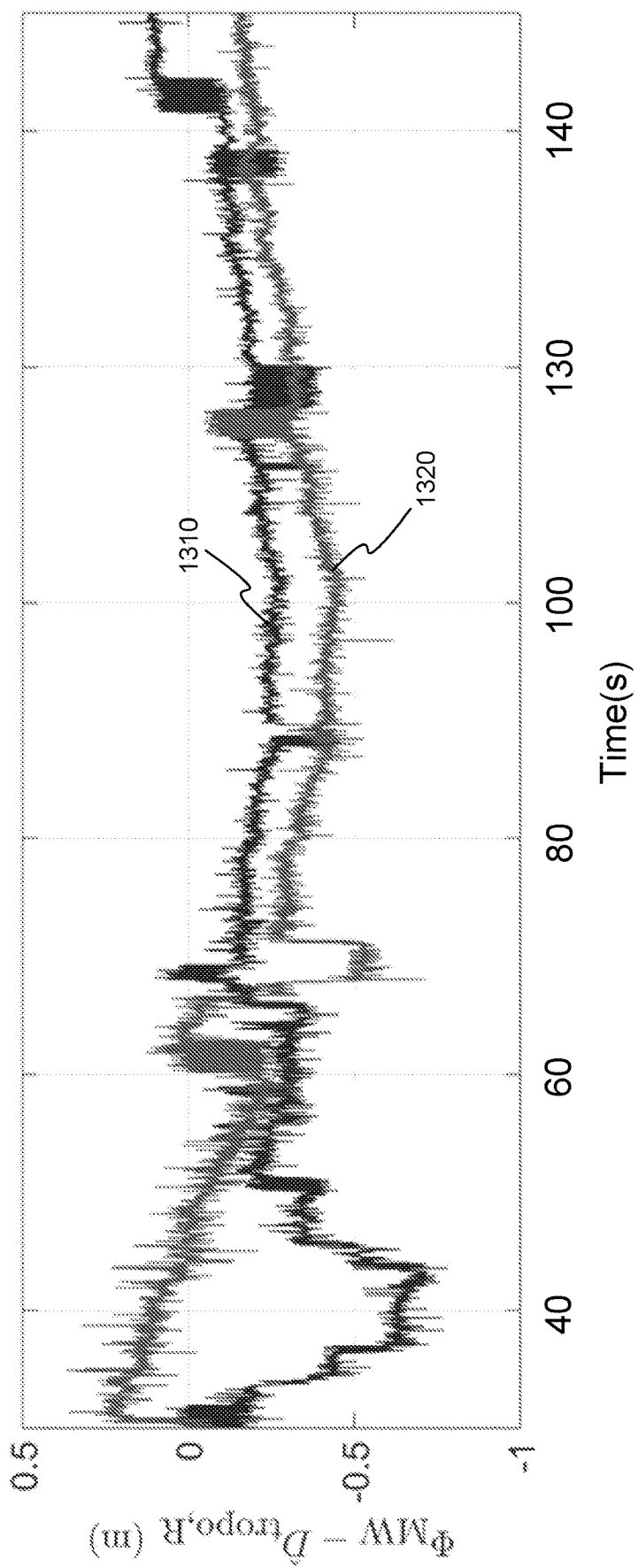
FIG. 13 is an exemplary plot showing the corrected phase obtained by applying a simple correction method to the data of FIG. 12, in accordance with various embodiments.

FIG. 13 is an exemplary plot 1300 showing the corrected phase obtained by applying a simple correction method to the data of FIG. 12, in accordance with various embodiments. In the simple correction method, a moving-window cycle slip correction is applied to the unwrapped phase measurements, with a moving window of 0.1 seconds (considering a 50 Hz data rate). Moving window corrected carrier phase measurement 1310 for the L1 signal and moving window corrected carrier phase measurement 1320 for the L2 signal are processed separately. If the phase measurement jumps more than 0.8 wavelengths within a window, a cycle slip is identified and is corrected by removing an integer number of wavelengths from all values after the jump. Comparing FIG. 13 with FIG. 12 shows that most of the cycle slips have been corrected. However, a few of them still remain and cause a bias of up to 0.7 meters.

Figure 14:
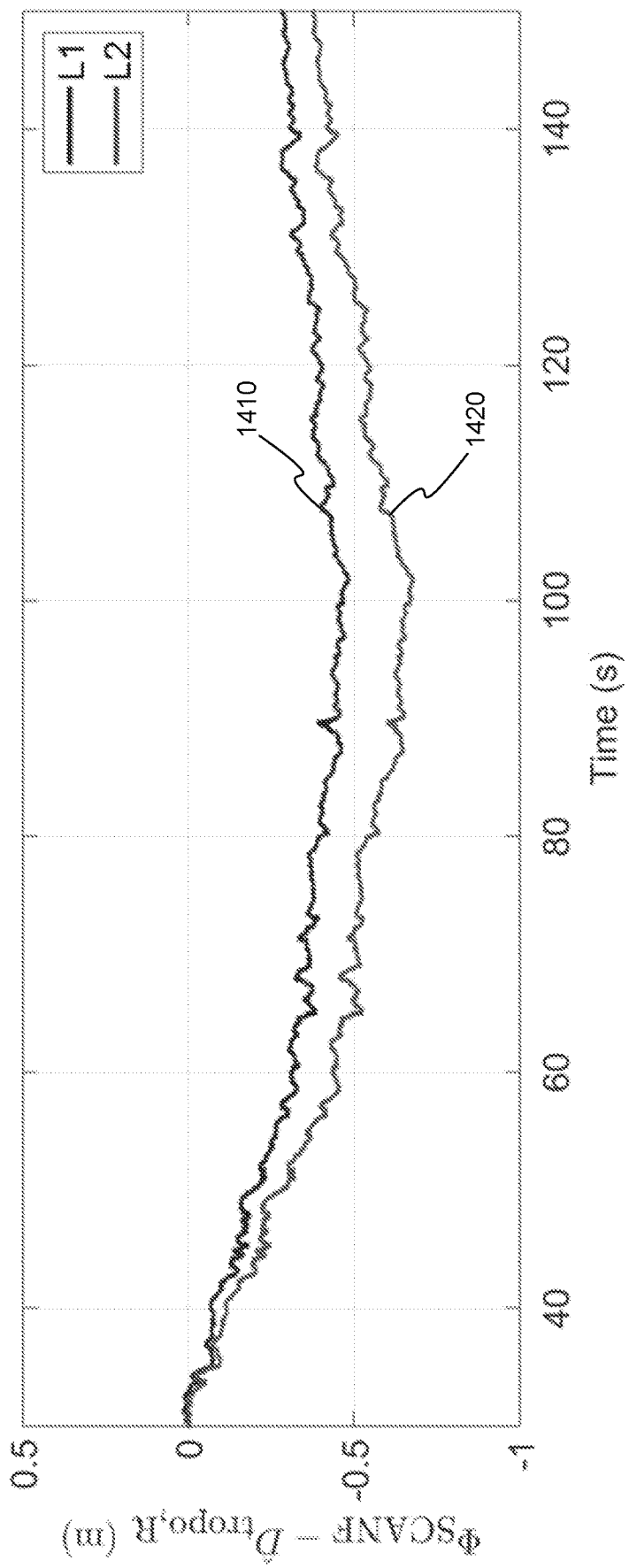
FIG. 14 is an exemplary plot showing the corrected phase obtained by applying the SCANF correction method to the data of FIG. 12, in accordance with various embodiments.

FIG. 14 is an exemplary plot 1400 showing the corrected phase obtained by applying the SCANF correction method to the data of FIG. 12, in accordance with various embodiments. In contrast to FIGS. 12 and 13, the carrier phase outputs from the SCANF approach do not have any cycle slips and are shown in solid lines 1410 and 1420. Line 1410 depicts the SCANF corrected carrier phase measurement for the L1 signal and line 1420 depicts the SCANF corrected carrier phase measurement for the L2 signal.

As described above, the SSHA can be retrieved from a phase measurement. As a result, SSHA values and sea surface height (SSH) values were retrieved from the unwrapped carrier phase measurements, the carrier phase measurements obtained using a simple correction method, and the carrier phase measurements obtained using the SCANF method. Again, the Hudson Bay GNSS data depicted in FIGS. 12-14 was used to calculate the SSHA and SSH values.

Figure 15:
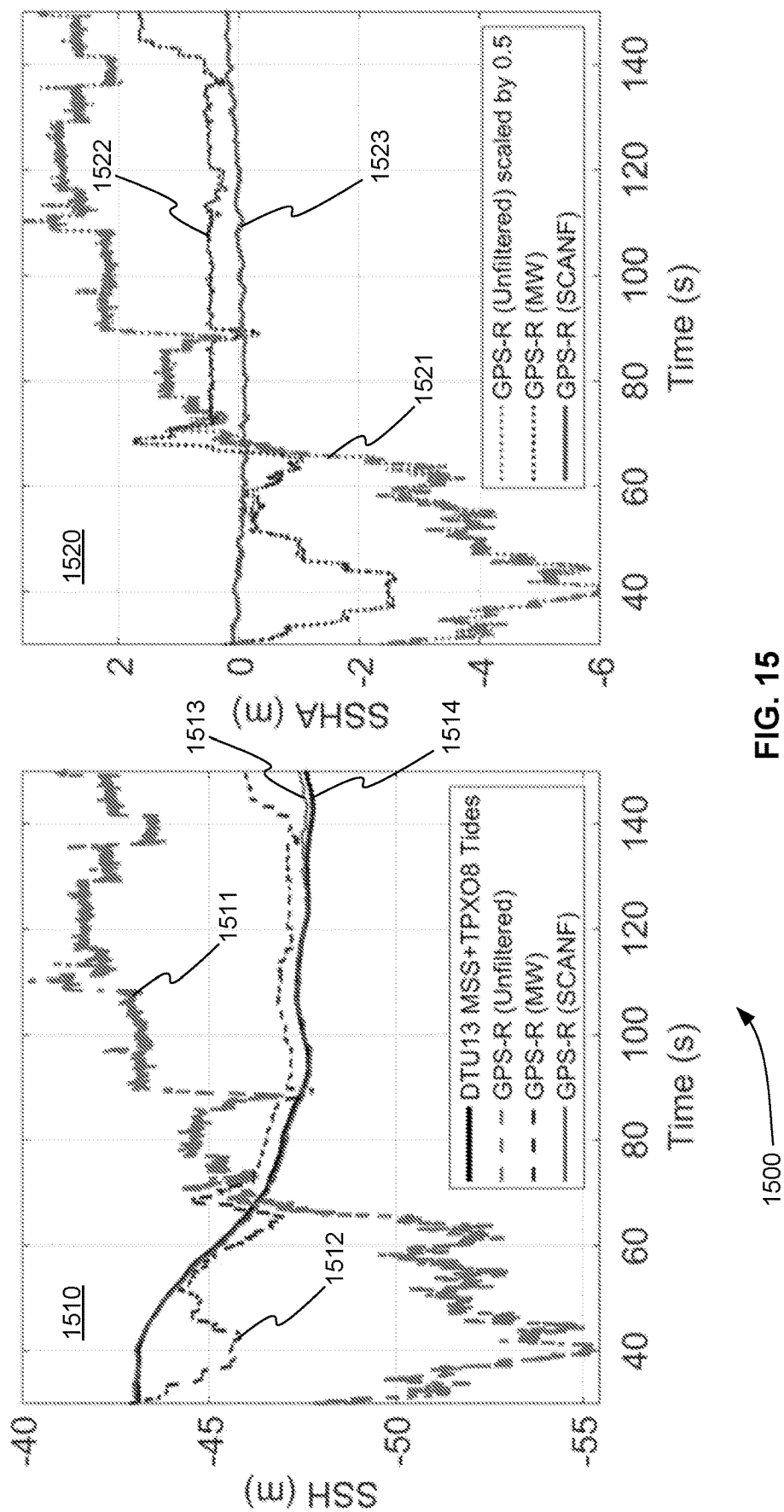
FIG. 15 is an exemplary pair of plots showing SSH values and SSHA values calculated for sea ice in Hudson Bay from unwrapped carrier phase measurements, carrier phase measurements obtained using a simple correction method, and carrier phase measurements obtained using the SCANF method, in accordance with various embodiments.

FIG. 15 is an exemplary pair 1500 of plots showing SSH values and SSHA values calculated for sea ice in Hudson Bay from unwrapped carrier phase measurements, carrier phase measurements obtained using a simple correction method, and carrier phase measurements obtained using the SCANF method, in accordance with various embodiments. In FIG. 15, plot 1510 depicts SSH values and plot 1520 depicts SSHA values. SSH values 1511 calculated from unwrapped carrier phase measurements, SSH values 1512 calculated from carrier phase measurements obtained using a simple correction method, SSH values 1513 calculated from the carrier phase measurements obtained using the SCANF method, and SSH values 1514 from MSS and tide models calculated from satellite altimetry are shown in plot 1510. SSHA values 1521 calculated from unwrapped carrier phase measurements, SSHA values 1522 calculated from carrier phase measurements obtained using a simple correction method, and SSH values 1523 calculated from the carrier phase measurements obtained using the SCANF method are shown in plot 1520.

FIG. 15 shows that retrieved SSH 1513 and SSHA 1523 using the SCANF method are consistent with SSH 1514 of the MSS and tide models and have centimeter-level precision. In contrast, SSH 1511 and SSHA 1521 of the unfiltered data and SSH 1512 and SSHA 1522 of a simple correction method have large errors and changing biases.

Receiver for Reducing Cycle Slips and Noise in Phase Measurements

Figure 16:
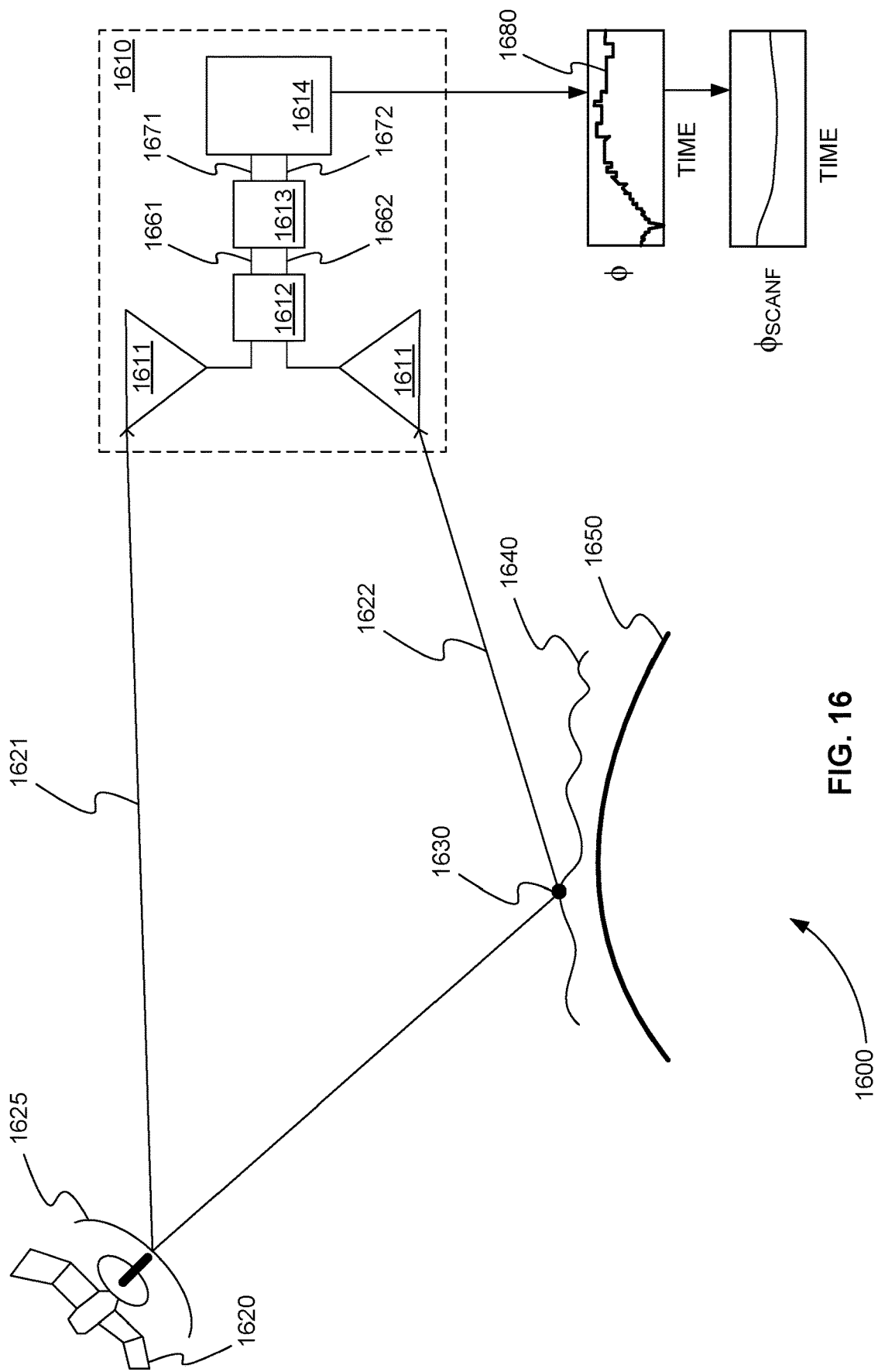
FIG. 16 is an exemplary diagram of a receiver for reducing cycle slips and noise in phase measurements of a reflected RF carrier signal, in accordance with various embodiments.

FIG. 16 is an exemplary diagram 1600 of a receiver for reducing cycle slips and noise in phase measurements of a reflected RF carrier signal, in accordance with various embodiments. Receiver 1610 includes one or more antennas 1611, RF front-end circuitry 1612, ADC 1613, and processor 1614.

One or more antennas 1611 receive DLOS RF signal component 1621 and RF signal component 1622 of RF carrier signal 1625. RF signal component 1622 is reflected from point 1630 on surface 1640 of earth 1650. RF carrier signal 1625 is transmitted from transmitter 1620 located above surface 1640 of earth 1650, for example.

Circuitry converts DLOS RF signal component 1621 to DLOS IF signal 1671 and converts RF signal component 1622 to a digital reflected IF signal 1672. In various embodiments, RF front-end circuitry 1612 down-converts DLOS RF signal component 1621 to DLOS IF signal 1661. RF front-end circuitry 1612 also down-converts RF signal component 1622 that is reflected from point 1630 to reflected IF signal 1662. ADC 1613 converts DLOS IF signal 1661 to digital DLOS IF signal 1671. ADC 1613 also converts reflected IF signal 1662 to digital reflected IF signal 1672.

Processor 1614 is used to receive signals, process signals, produce data, or provide control instructions. Processor 1614 can be part of receiver 1610, as shown in FIG. 16, or can be a separate device, for example. Processor 1614 can be, but is not limited to, a controller, a computer, a microprocessor, the computer system of FIG. 1, or any device capable of sending, receiving, and processing signals and data.

Processor 1614 performs OL tracking with SCANF, for example. Processor 1614 generates a reference signal using digital DLOS IF signal 1671. In various embodiments, processor 1614 generates modeled reference signal parameters using digital DLOS IF signal 1671 and known locations of one or more antennas 1611, transmitter 1620, and point 1630. Processor 1614 generates a reference signal based on the modeled reference signal parameters.

Processor 1614 correlates the reference signal with digital reflected IF signal 1672 to produce correlation results. In various embodiments, the correlation results include I and Q correlation results.

Processor 1614 calculates an estimated $C/N_0$ and an estimated $\phi$ 1680 for digital reflected IF signal 1672 from the correlation results. Processor 1614 applies a filter to estimated $\phi$ 1680 to produce an estimated filtered phase 1690, $\phi_{SCANF}$. The filter is adapted to filter estimated $\phi$ 1680 using the estimated $C/N_0$ to reduce cycle slips and noise in estimated $\phi_{SCANF}$ 1690. In various embodiments, the filter is a KF.

In various embodiments, one or more antennas 1611 can include a first antenna to receive DLOS RF signal component 1621 and a second antenna to receive RF signal component 1622 that is reflected from point 1630, as shown in FIG. 16.

In various embodiments, RF carrier signal 1625 is a GNSS carrier signal, and the locations of one or more antennas 1611, transmitter 1620, and point 1630 are determined from information carried by the GNSS carrier signal.

In various embodiments, RF carrier signal 1625 is a carrier signal of a communications system and the locations of the one or more antennas, the transmitter, and the point are determined from information transmitted separately from ground stations of the communications system.

In various embodiments, estimated $\phi$ 1680 is unwrapped before the KF is applied.

In various embodiments, the KF is adapted to filter estimated $\phi$ 1680 using the estimated $C/N_0$ to reduce cycle slips and noise in estimated $\phi_{SCANF}$ 1690 by adapting a covariance of a process noise component of the KF to include a time-dependent measurement variance of the i-th signal that is based on instantaneous estimates of the estimated $C/N_0$ and an integration time.

In various embodiments, the KF is further adapted to update a state vector through a discrete-time dynamics model that includes a covariance matrix of a dynamics vector that is modeled using a power spectral density that represents the tropospheric effects and reflection from the sea surface. In various embodiments, the covariance matrix of the dynamics vector is further modeled using a power spectral density that represents the ionospheric effects on a first (L1) signal with a first frequency. In various embodiments, the covariance matrix of the dynamics vector is further modeled using a power spectral density that represents a difference between the noise of the L1 signal and the noise of a second (L2) signal with a second frequency due to the ionosphere.

In various embodiments, the KF is further adapted to re-estimate a control-input model, B, to compensate for a bias introduced by the cycle slip.

In various embodiments, processor 1614 further removes phase errors due to tropospheric and ionospheric effects from estimated $\phi_{SCANF}$ 1690 to produce a sea surface height anomaly (SSHA) value, $\Delta H$.

In various embodiments, processor 1614 applies the KF to estimated $\phi$ 1680 to produce estimated $\phi_{SCANF}$ 1690 in real-time or as RF signal component 1622 is received. In various alternative embodiments, processor 1614 applies the KF to estimated $\phi$ 1680 to produce estimated $\phi_{SCANF}$ 1690 in a post-processing step or after all reflected signals have been received.

Method for Reducing Cycle Slips and Noise in Phase Measurements

Figure 17:
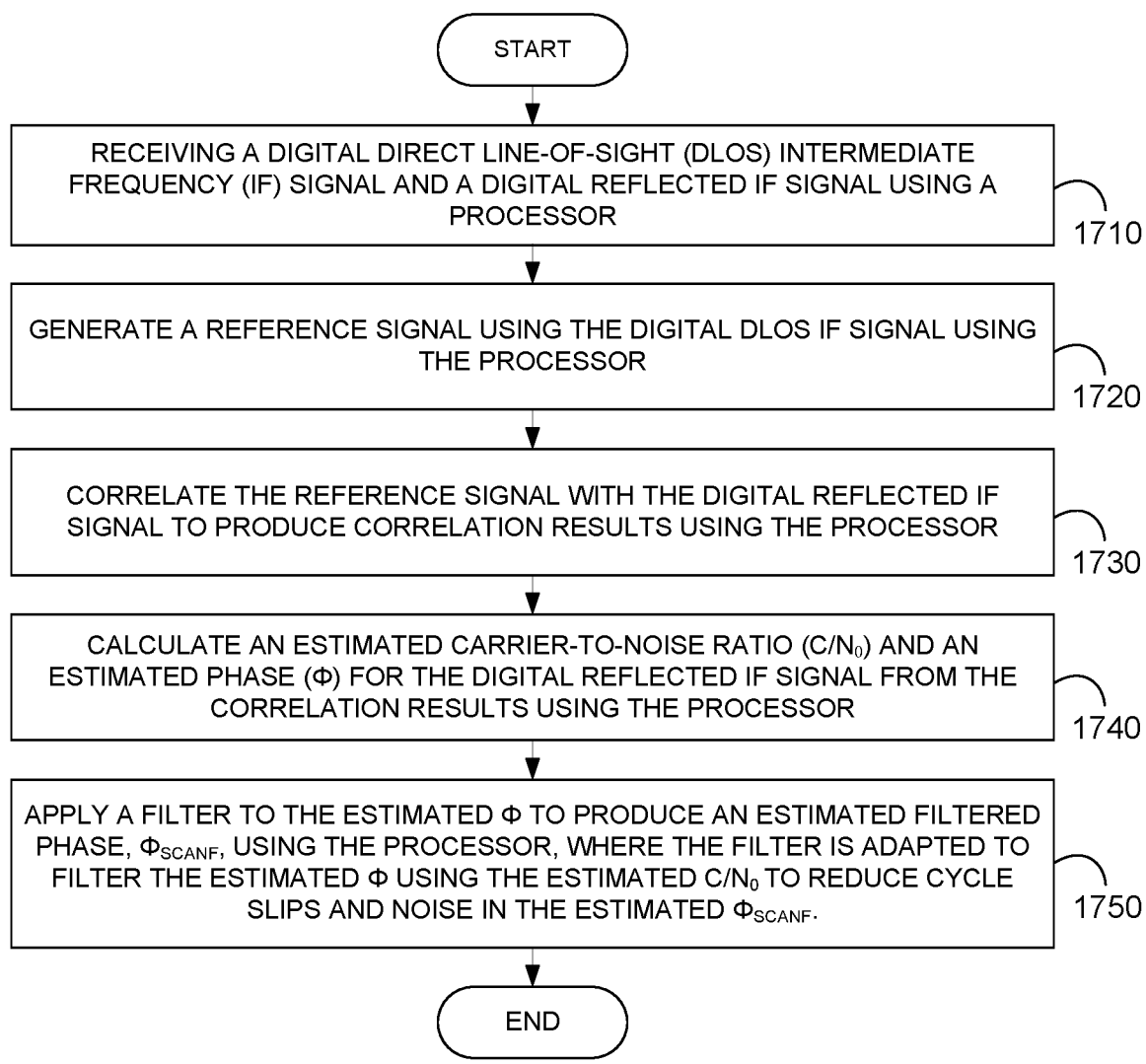
FIG. 17 is an exemplary flowchart showing a method for reducing cycle slips and noise in phase measurements of a reflected RF carrier signal, in accordance with various embodiments.

FIG. 17 is an exemplary flowchart 1700 showing a method for reducing cycle slips and noise in phase measurements of a reflected RF carrier signal, in accordance with various embodiments.

In step 1710 of method 1700, a digital DLOS IF signal and a digital reflected IF signal are received using a processor. The digital DLOS IF signal is converted from a DLOS RF signal component of an RF carrier signal and the digital reflected IF signal is converted from a reflected RF signal component of the RF carrier signal that is reflected from a specular point (SP) on the surface of the earth.

In step 1720, a reference signal is generated using the digital DLOS IF signal using the processor.

In step 1730, the reference signal is correlated with the digital reflected IF signal to produce correlation results using the processor.

In step 1750, an estimated $C/N_0$ and an estimated $\phi$ are calculated for the digital reflected IF signal from the correlation results using the processor.

In step 1760, a KF is applied to the estimated $\phi$ to produce an estimated filtered phase, $\phi_{SCANF}$, using the processor. The KF is adapted to filter the estimated $\phi$ using the estimated $C/N_0$ to reduce cycle slips and noise in the estimated $\phi_{SCANF}$.

Computer Program Product for Reducing Cycle Slips and Noise in Phase Measurements In various embodiments, computer program products include a tangible computer-readable storage medium whose contents include a program with instructions being executed on a processor so as to perform a method for reducing cycle slips and noise in phase measurements of a reflected RF carrier signal. This method is performed by a system that includes one or more distinct software modules.

Figure 18:
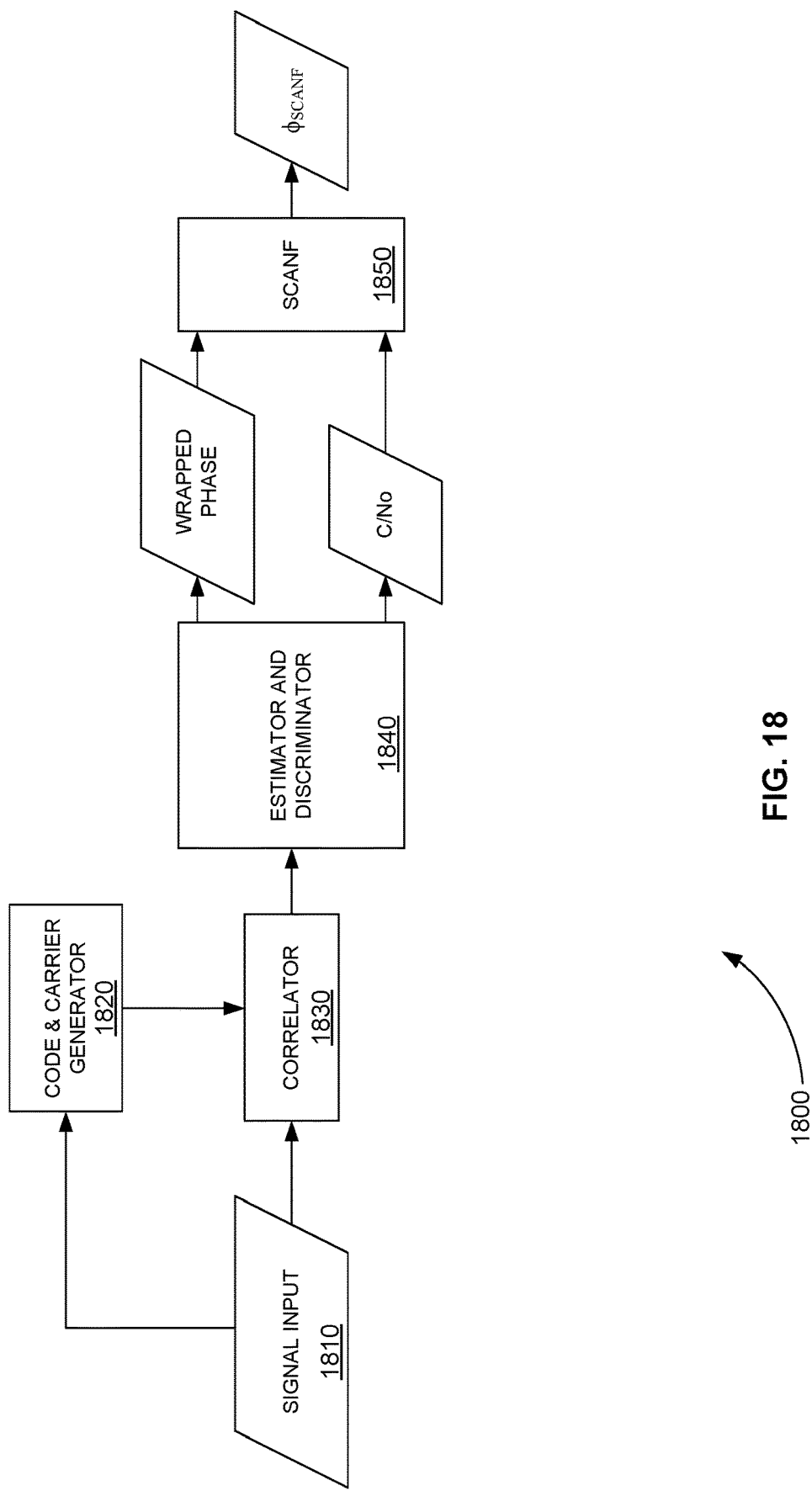
FIG. 18 is a schematic diagram of a system that includes one or more distinct software modules that perform a method for reducing cycle slips and noise in phase measurements of a reflected RF carrier signal, in accordance with various embodiments.

FIG. 18 is a schematic diagram of a system 1800 that includes one or more distinct software modules that perform a method for reducing cycle slips and noise in phase measurements of a reflected RF carrier signal, in accordance with various embodiments. System 1800 includes signal input module 1810, reference generator 1820, correlator 1830, estimator and discriminator module 1840, and SCANF module 1850.

Signal input module 1810 receives a digital direct line-of-sight (DLOS) intermediate frequency (IF) signal and a digital reflected IF signal. The digital DLOS IF signal is converted from a DLOS RF signal component of an RF carrier signal and the digital reflected IF signal is converted from a reflected RF signal component of the RF carrier signal that is reflected from a specular point (SP) on the surface of the earth.

Reference generator 1820 generates a reference signal using the digital DLOS IF signal.

Correlator 1830 correlates the reference signal with the digital reflected IF signal to produce correlation results.

Estimator and discriminator module 1840 calculates an estimated $C/N_0$ and an estimated $\phi$ for the digital reflected IF signal from the correlation results.

SCANF module 1850 applies a filter to the estimated $\phi$ to produce an estimated filtered phase, $\phi_{SCANF}$. The filter is adapted to filter the estimated $\phi$ using the estimated $C/N_0$ to reduce cycle slips and noise in the estimated $\phi_{SCANF}$.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A receiver for reducing cycle slips and noise in phase measurements of a reflected radio frequency (RF) carrier signal, comprising:
    one or more antennas that receive a direct line-of-sight (DLOS) RF signal component and an RF signal component that is reflected from a specular point (SP) on the surface of the earth of an RF carrier signal transmitted from a transmitter located above the surface of the earth;
    circuitry that converts the DLOS RF signal component to a digital DLOS IF signal and converts the RF signal component to a digital reflected IF signal; and
    a processor that
        generates a reference signal using the digital DLOS IF signal,
        correlates the reference signal with the digital reflected IF signal to produce correlation results,
        calculates an estimated carrier-to-noise ratio ($C/N_0$) and an estimated phase ($\phi$) for the digital reflected IF signal from the correlation results, and
        applies a filter to the estimated $\phi$ to produce an estimated filtered phase, $\phi_{SCANF}$, wherein the filter is adapted to filter the estimated $\phi$ using the estimated $C/N_0$ to reduce cycle slips and noise in the estimated $\phi_{SCANF}$.

2. The receiver of claim 1, wherein the circuitry comprises RF front-end circuitry that down-converts the DLOS RF signal component to a DLOS intermediate frequency (IF) signal and down-converts the RF signal component that is reflected from the SP to a reflected IF signal and an analog-to-digital converter (ADC) that converts the DLOS IF signal to a digital DLOS IF signal and converts the reflected IF signal to a digital reflected IF signal.

3. The receiver of claim 2, wherein the processor generates a reference signal using the digital DLOS IF signal by
    generating modeled reference signal parameters using the digital DLOS IF signal and known locations of the one or more antennas, the transmitter, and the SP and
    generating the reference signal based on the modeled reference signal parameters.

4. The receiver of claim 1, wherein the correlation results comprise in-phase (I) and quadrature-phase (Q) correlation results.

5. The receiver of claim 1, wherein the filter comprises a Kalman filter (KF).

6. The receiver of claim 1, wherein the one or more antennas comprise a first antenna to receive the DLOS RF signal component and a second antenna to receive the RF signal component that is reflected from the SP.

7. The receiver of claim 1, wherein the RF carrier signal comprises a global navigation satellite system (GNSS) carrier signal and the locations of the one or more antennas, the transmitter, and the SP are determined from information carried by the GNSS carrier signal.

8. The receiver of claim 1, wherein the RF carrier signal comprises a carrier signal of a communications system and the locations of the one or more antennas, the transmitter, and the SP are determined from information transmitted separately from ground stations of the communications system.

9. The receiver of claim 5, wherein the estimated $\phi$ is unwrapped before the KF is applied.

10. The receiver of claim 5, wherein the KF is adapted to filter the estimated $\phi$ using the estimated $C/N_0$ to reduce cycle slips and noise in the estimated $\phi_{SCANF}$ by
adapting a covariance of a process noise component of the KF to include a time-dependent measurement variance of the i-th signal that is based on instantaneous estimates of the estimated $C/N_0$ and an integration time.

11. The receiver of claim 5, wherein the KF is further adapted to update a state vector through a discrete-time dynamics model that includes a covariance matrix of a dynamics vector that is modeled using a power spectral density that represents the tropospheric effects and reflection from the sea surface.

12. The receiver of claim 11, wherein the covariance matrix of the dynamics vector is further modeled using a power spectral density that represents the ionospheric effects on a first (L1) signal with a first frequency.

13. The receiver of claim 12, wherein the covariance matrix of the dynamics vector is further modeled using a power spectral density that represents a difference between noise of the L1 signal and noise of a second (L2) signal with a second frequency due to the ionosphere.

14. The receiver of claim 5, wherein the KF is further adapted to re-estimate a control-input model, B, to compensate for a bias introduced by the cycle slip.

15. The receiver of claim 1, wherein the processor further removes phase errors due to tropospheric and ionospheric effects from the estimated $\phi_{SCANF}$ to produce a sea surface height anomaly (SSHA) value, $\Delta H$.

16. The receiver of claim 5, wherein the processor applies the KF to the estimated $\phi$ to produce the estimated $\phi_{SCANF}$ in real-time.

17. The receiver of claim 5, wherein the process applies the KF to the estimated $\phi$ to produce the estimated $\phi_{SCANF}$ in a post-processing step.

18. A method for reducing cycle slips and noise in phase measurements of a reflected radio frequency (RF) carrier signal, comprising:
receiving a digital direct line-of-sight (DLOS) intermediate frequency (IF) signal and a digital reflected IF signal using a processor, wherein the digital DLOS IF signal is converted from a DLOS RF signal component of an RF carrier signal and the digital reflected IF signal is converted from a reflected RF signal component of the RF carrier signal that is reflected from a specular point (SP) on the surface of the earth;
generating a reference signal using the digital DLOS IF signal using the processor;
correlating the reference signal with the digital reflected IF signal to produce results using the processor;
calculating an estimated carrier-to-noise ratio ($C/N_0$) and an estimated phase ($\phi$) for the digital reflected IF signal from the correlation results using the processor; and
applying a filter to the estimated $\phi$ to produce an estimated filtered phase, $\phi_{SCANF}$, using the processor, wherein the filter is adapted to filter the estimated $\phi$ using the estimated $C/N_0$ to reduce cycle slips and noise in the estimated $\phi_{SCANF}$.

19. A computer program product, comprising a non-transitory and tangible computer-readable storage medium whose contents include a program with instructions being executed on a processor to perform a method for reducing cycle slips and noise in phase measurements of a reflected radio frequency (RF) carrier signal, the method comprising:
providing a system, wherein the system comprises one or more distinct software modules, and wherein the distinct software modules comprise a signal input module, a reference generator, a correlator, an estimator and discriminator module, and a simultaneous cycle-slip and noise filtering (SCANF) module;
receiving a digital direct line-of-sight (DLOS) intermediate frequency (IF) signal and a digital reflected IF signal using the signal input module, wherein the digital DLOS IF signal is converted from a DLOS RF signal component of an RF carrier signal and the digital reflected IF signal converted from a reflected RF signal component of the RF carrier signal that is reflected from a specular point (SP) on the surface of the earth;
generating a reference signal using the digital DLOS IF signal using the reference generator;
correlating the reference signal with the digital reflected IF signal to produce correlation results using the correlator;
calculating an estimated carrier-to-noise ratio ($C/N_0$) and an estimated phase ($\phi$) for the digital reflected IF signal from the correlation results using the estimator and discriminator module; and
applying a filter to the estimated $\phi$ to produce an estimated filtered phase, $\phi_{SCANF}$, using the SCANF module, wherein the filter is adapted to filter the estimated $\phi$ using the estimated $C/N_0$ to reduce cycle slips and noise in the estimated $\phi_{SCANF}$.

* * * * *